(12) United States Patent
Chertkov et al.

(10) Patent No.: US 12,530,608 B2
(45) Date of Patent: Jan. 20, 2026

(54) APPARATUSES, COMPUTER-IMPLEMENTED METHODS, AND COMPUTER PROGRAM PRODUCTS FOR QUBIT REUSE IN A QUANTUM COMPUTING ENVIRONMENT

(71) Applicant: Quantinuum LLC, Broomfield, CO (US)

(72) Inventors: Eli Chertkov, Broomfield, CO (US); Matthew DeCross, Broomfield, CO (US); Michael Feig, Broomfield, CO (US); Megan Kohagen, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 533 days.

(21) Appl. No.: 17/974,991

(22) Filed: Oct. 27, 2022

(65) Prior Publication Data
US 2023/0409941 A1 Dec. 21, 2023

Related U.S. Application Data

(60) Provisional application No. 63/378,325, filed on Oct. 4, 2022, provisional application No. 63/284,722, filed on Dec. 1, 2021.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC .............................. G06N 10/20; G06N 10/40
See application file for complete search history.

(56) References Cited

U.S. PATENT DOCUMENTS

| 11,119,773 | B1* | 9/2021 | Soeken | ................... G06F 15/82 |
| 2020/0293935 | A1* | 9/2020 | Greenberg | ............... G06N 7/08 |
| 2020/0380084 | A1* | 12/2020 | Gambetta | .............. G06N 10/20 |
| 2021/0173810 | A1* | 6/2021 | Feig | ........................ G06F 30/20 |
| 2021/0224049 | A1* | 7/2021 | Haener | ................... G06F 8/443 |

(Continued)

FOREIGN PATENT DOCUMENTS

| EP | 3832555 A1 | 6/2021 |
| JP | 2021-093154 A | 6/2021 |

OTHER PUBLICATIONS

English Translation of JP Office Action, including Search Report dated Apr. 15, 2025 for JP Application No. 2024533075, 12 page(s).

(Continued)

*Primary Examiner* — Christopher E Dunay
(74) *Attorney, Agent, or Firm* — Alston & Bird LLP

(57) ABSTRACT

Embodiments of the present disclosure provide for qubit reuse within a quantum computing environment for a quantum program in a quantum computing environment. In this regard, embodiments generate an optimized quantum program based on an initial quantum program. In some embodiments, the optimized quantum program may utilize fewer computing resources, such as qubits, than the initial quantum program. In some embodiments, the optimized quantum program may be compiled and executed in the quantum computing environment.

20 Claims, 11 Drawing Sheets

(56) References Cited

U.S. PATENT DOCUMENTS

2022/0083888 A1\* 3/2022 Ruedinger ............. G06N 10/20
2022/0382827 A1 12/2022 Yalovetzky et al.

OTHER PUBLICATIONS

JP Office Action, including Search Report Mailed on Apr. 15, 2025 for JP Application No. 2024533075, 9 page(s).
Decross, Matthew, et al., "Qubit-reuse compilation with mid-circuit measurement and reset", submitted Oct. 14, 2022 to arxiv.org, Cornell University Library, retrieved from the Internet at https://arxiv.org/pdf/2210.08039v1.pdf on Feb. 14, 2024, 19 pages.
Outgoing—ISA/210—International Search Report Mailed on Jan. 2, 2024 for WO Application No. PCT/US22/051412, 3 page(s).
Outgoing Written Opinion of the ISA Mailed on Jan. 2, 2024 for WO Application No. PCT/US22/051412, 11 page(s).
Paler, Alexandru, et al., "Wire Recycling for Quantum Circuit Optimization", Phys. Rev. A, dated Oct. 3, 2016, vol. 94, No. 042337, initially submitted to arxiv.org, Cornell University Library, on Sep. 3, 2016, retrieved from the Internet at https://arxiv.org/pdf/1609.00803v2.pdf, 8 pages.
English translation of JP Decision to Grant dated Sep. 9, 2025 for JP Application No. 2024533075, 2 page(s).
JP Decision to Grant Mailed on Sep. 9, 2025 for JP Application No. 2024533075, 3 page(s).

\* cited by examiner

US 12,530,608 B2

APPARATUSES, COMPUTER-IMPLEMENTED METHODS, AND COMPUTER PROGRAM PRODUCTS FOR QUBIT REUSE IN A QUANTUM COMPUTING ENVIRONMENT

CROSS-REFERENCE TO RELATED APPLICATIONS

The present application claims the benefit of U.S. Provisional Patent Application Ser. No. 63/284,722, which was filed on Dec. 1, 2021, and of U.S. Provisional Patent Application Ser. No. 63/378,325, which was filed on Oct. 4, 2022, the entire contents of each which are incorporated by reference herein for all purposes.

TECHNOLOGICAL FIELD

Embodiments of the present disclosure generally relate to qubit reuse in optimizing a quantum program for execution in a quantum computing environment.

BACKGROUND

Quantum programs are performed by performing a series of gates on a set of qubits. Quantum computing environments are limited in the number of qubits available. For example, in a quantum charge-coupled device "QCCD" architecture, the qubits are physical ions and/or other atomic objects and the number of qubits available in the quantum computing environment is limited by the number of ions and/or other atomic objects that can be confined by an atomic object confinement apparatus of the quantum computing environment.

The physical limits on the number of available qubits in a given quantum computing environment constrains the quantum computing environment's ability to execute some quantum computing programs. For example, conventionally a quantum computing environment cannot perform a quantum program requiring more qubits than the quantum computing environment has available. As described herein, the Applicant has discovered problems with current implementations of quantum programs and the compilation of quantum programs for execution and/or performance by quantum computing environments. Through applied effort, ingenuity, and innovation, Applicant has solved many of these identified problems in the various implementations and solutions embodied in the present disclosure, which are described in detail below.

BRIEF SUMMARY

In general, embodiments of the present disclosure provided herein provide for improved quantum programs in a quantum computing environment (e.g., a QCCD quantum computing environment). Such improved quantum programs include an optimized quantum program that improves the overall execution of the quantum program by reducing the amount of quantum computing resources required in executing the quantum program, such as by reducing the number of overall number of qubits required to execute a quantum program. Other implementations will be, or will become, apparent to one with skill in the art upon examination of the following figures and detailed description. It is intended that all such additional implementations be included within this description be within the scope of the disclosure and be protected by the following claims.

In accordance with one aspect of the disclosure, a computer-implemented method for improved global resource usage in a quantum computing environment is provided. The computer-implemented method may be performed via any of the various computing devices as depicted and described herein, for example embodied in hardware, software, firmware, and/or any combination thereof. In accordance with at least one example implementation of the computer-implemented method, the example computer-implemented method includes receiving an initial quantum program. The example computer-implemented method further includes identifying, from the initial quantum program, an initial qubit set. The example computer-implemented method further includes determining, based on the initial quantum program and the initial qubit set, one or more causal cones associated with the initial quantum program. The example computer-implemented method further includes generating an optimized quantum program based on the initial quantum program, the initial input qubit set, and the one or more causal cones.

Additionally or alternatively, in some embodiments of the example computer-implemented method, the optimized quantum program is associated with an optimized input qubit set.

Additionally or alternatively, in some embodiments of the example computer-implemented method, the optimized input qubit set includes one or more fewer qubits than the initial input qubit set.

Additionally or alternatively, in some embodiments of the example computer-implemented method, the optimized quantum program includes at least one of a measurement operation or a reset operation.

Additionally or alternatively, in some embodiments of the example computer-implemented method, the optimized quantum program includes the same gating operations as the initial quantum program.

Additionally or alternatively, in some embodiments of the example computer-implemented method, the computer-implemented method further includes executing the optimized quantum program on the quantum computer.

Additionally or alternatively, in some embodiments of the example computer-implemented method, wherein executing the optimized quantum program comprises executing a measurement operation to measure an output state of at least one qubit, executing at least one reset operation to reset the at least one qubit, and executing at least one gate operation on the at least one qubit after executing the reset operation.

Additionally or alternatively, in some embodiments of the example computer-implemented method, the computer-implemented method further includes determining a dual of the initial quantum program; determining, based on the dual of the initial quantum program, one or more causal cones associated with the dual of the initial quantum program; and generating an optimized dual quantum program based on the dual of the initial quantum program, and the one or more causal cones associated with the dual of the initial quantum program.

Additionally or alternatively, in some embodiments of the example computer-implemented method, the computer-implemented method further includes determining a first reduced number of qubits corresponding to the optimized quantum program; and determining a second reduced number of qubits corresponding to the optimized dual quantum program.

Additionally or alternatively, in some embodiments of the example computer-implemented method, the computer-implemented method further includes when the first reduced number of qubits is smaller than or equal to the second reduced number of qubits, compiling and/or causing execution of the optimized quantum program; and when the second reduced number of qubits smaller than the first recued number of qubits, compiling and/or causing execution of a dual of the optimized dual quantum program.

In accordance with another aspect of the present disclosure, an apparatus is provided, and in one example of the apparatus, the example apparatus comprises at least one processor and at least one non-transitory memory having computer-coded instructions stored thereon. The computer-coded instructions, in execution with the at least one processor, configures the apparatus to perform any one of the example computer-implemented methods described herein. In another example of the apparatus, the example apparatus comprises means for performing each step of any one of the computer-implemented methods described herein.

In accordance with yet another aspect of the present disclosure, a computer program product is provided, and in one example of the computer program product, the example computer program product includes at least one non-transitory computer-readable storage medium having computer program code stored thereon that, in execution with at least one processor, configures the computer program product for performing any one of the example computer-implemented methods described herein.

BRIEF DESCRIPTION OF THE DRAWINGS

Having thus described various embodiments of the disclosure in general terms, reference is now made to the accompanying drawings, which are not necessarily drawn to scale.

Figure 1:
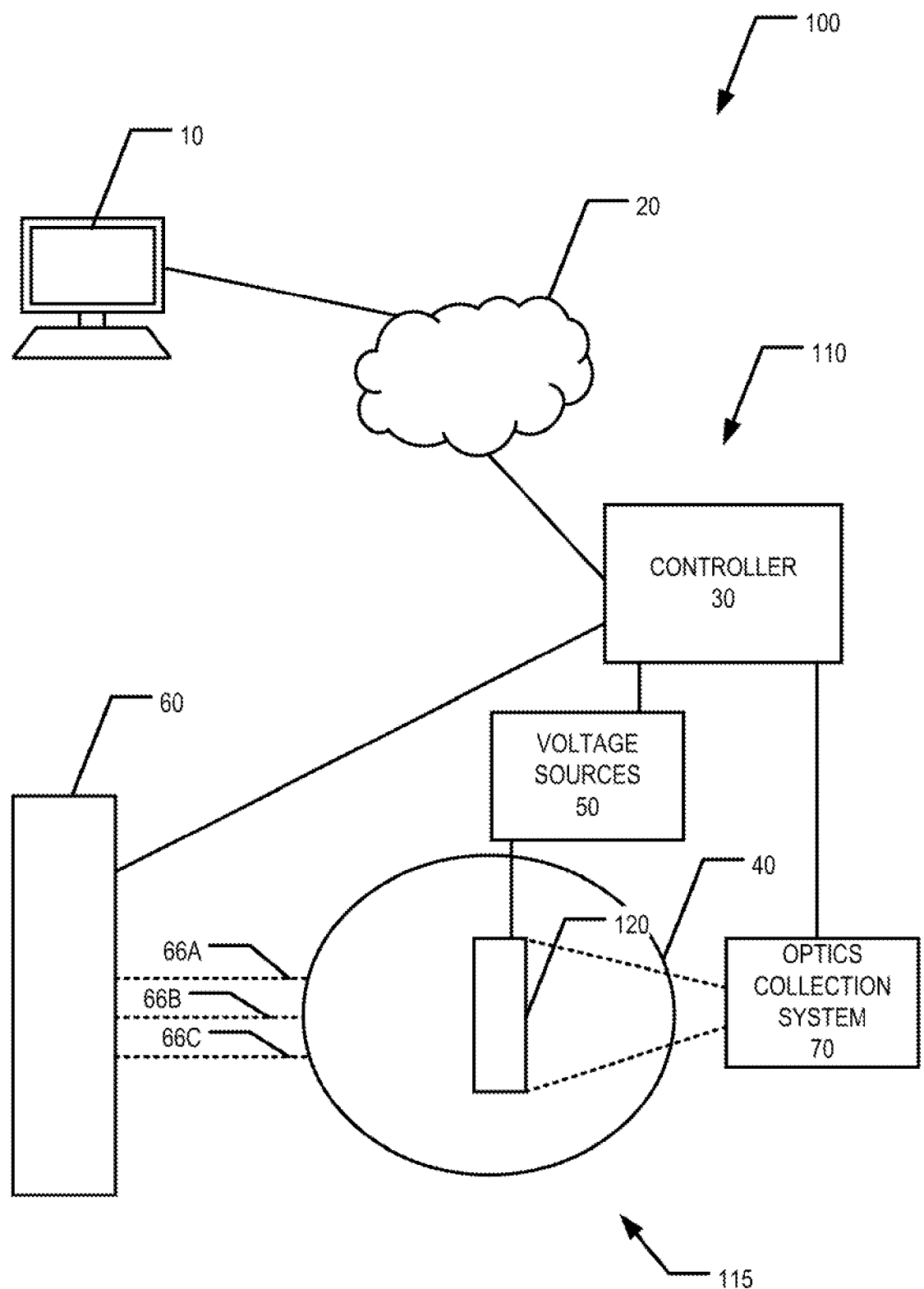

FIG. 1 is a schematic diagram illustrating an example quantum computing system comprising a quantum system controller according to an example embodiment.

Figure 2:
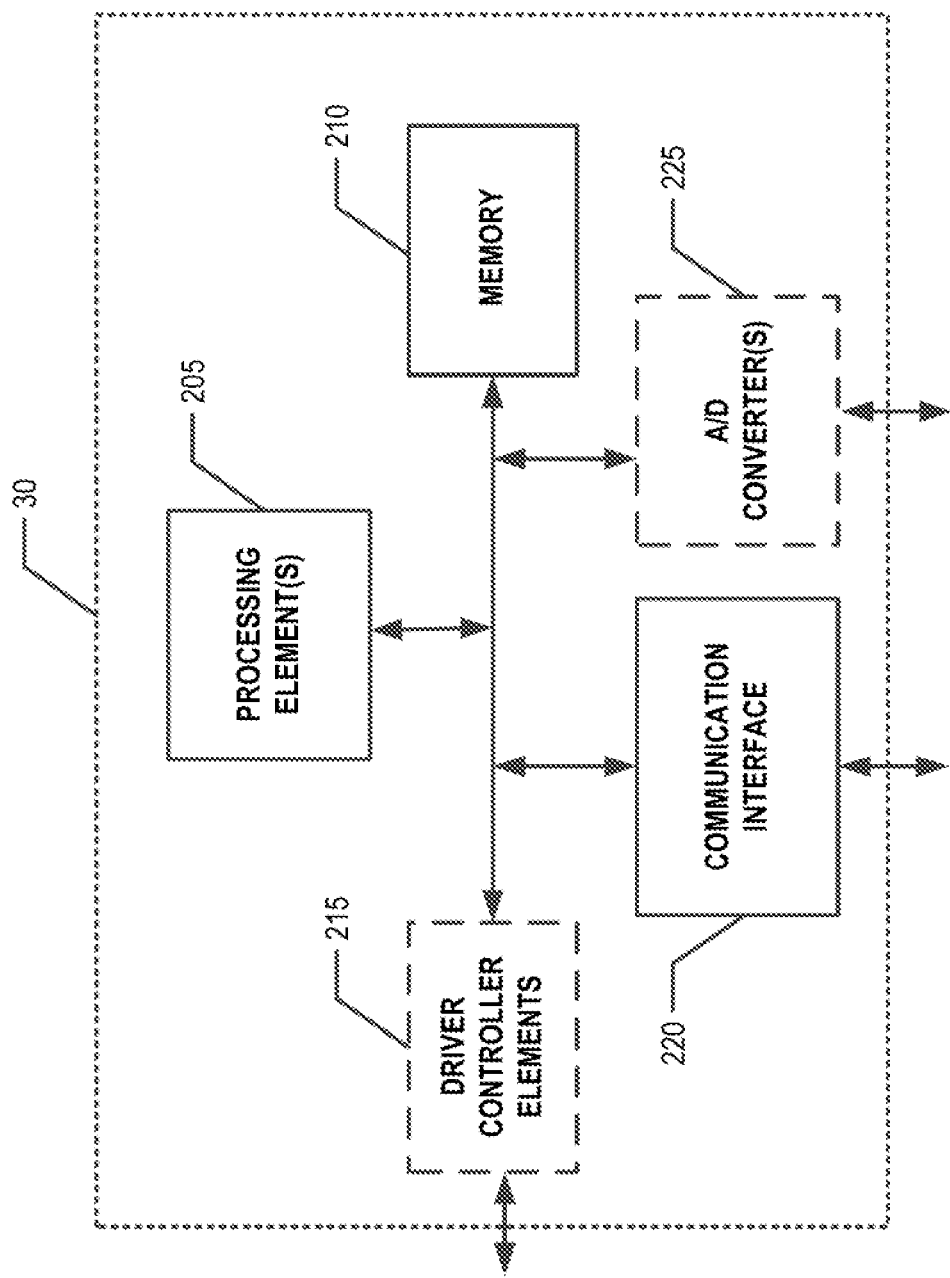

FIG. 2 is a schematic diagram of an example quantum system controller of a quantum computer.

Figure 3:
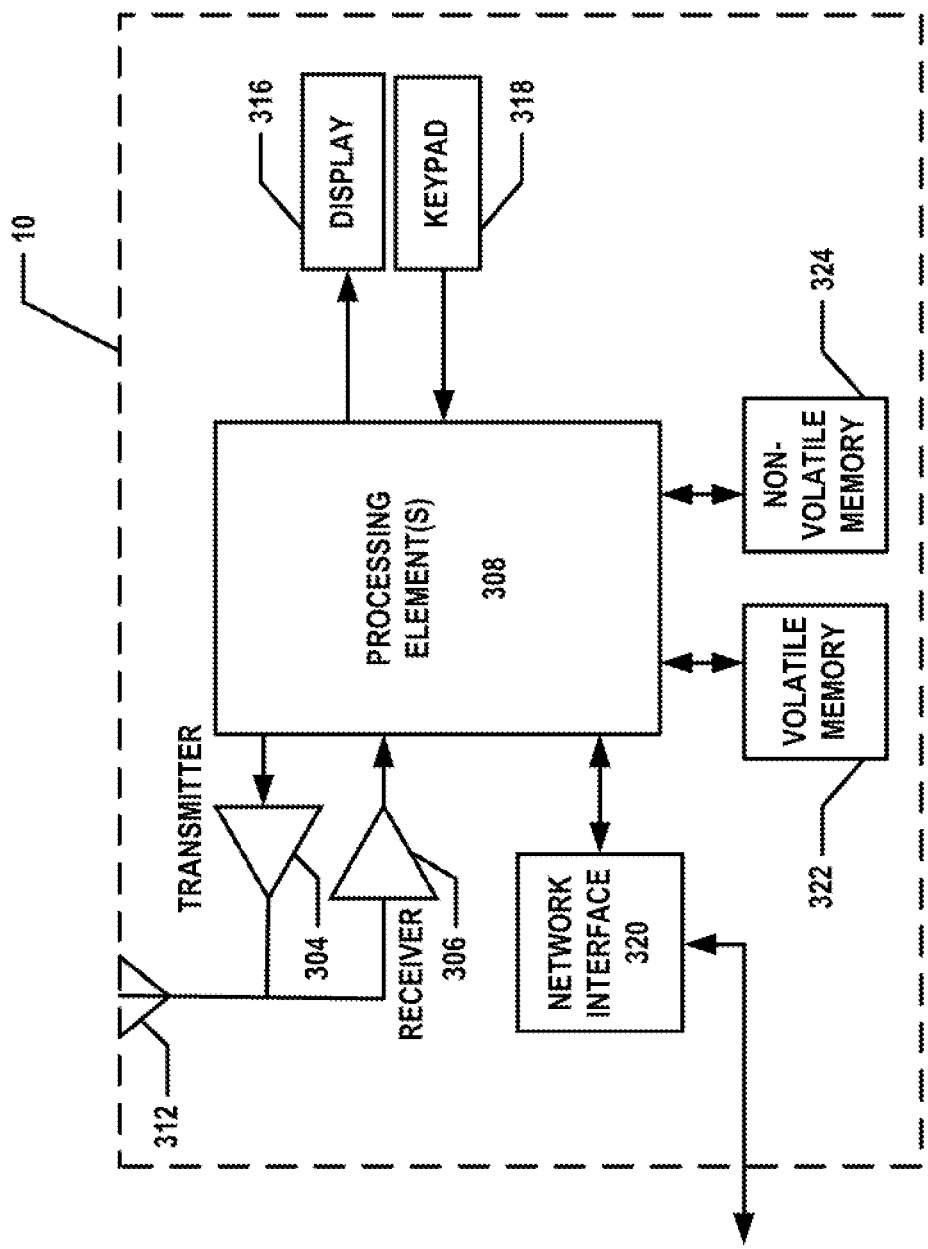

FIG. 3 is a schematic diagram of an example computing entity of a quantum computer system that may be used in accordance with an example embodiment.

Figure 4:
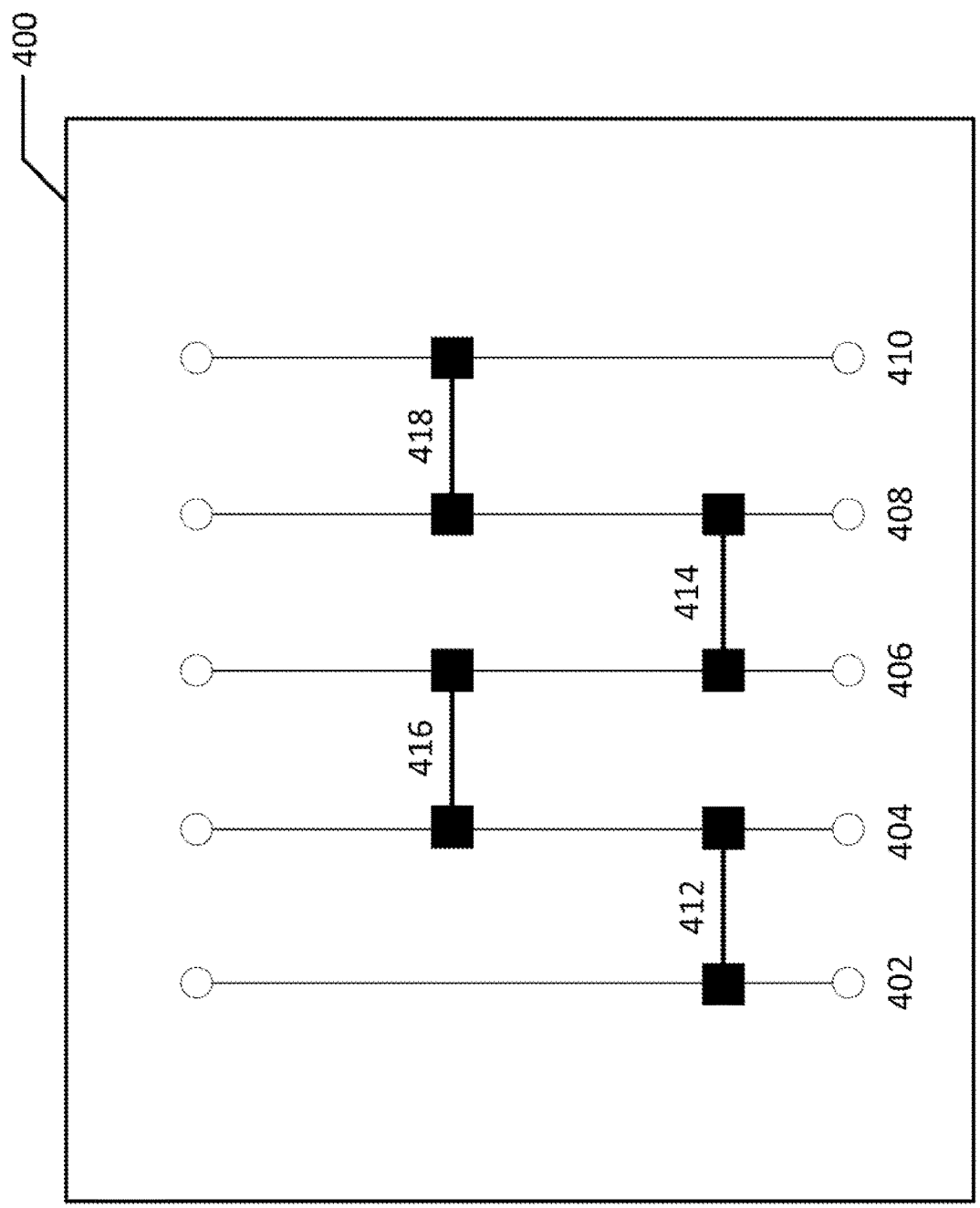

FIG. 4 illustrates a first example quantum program representing an example qubit set processable in accordance with at least some example embodiments of the present disclosure.

Figure 5:
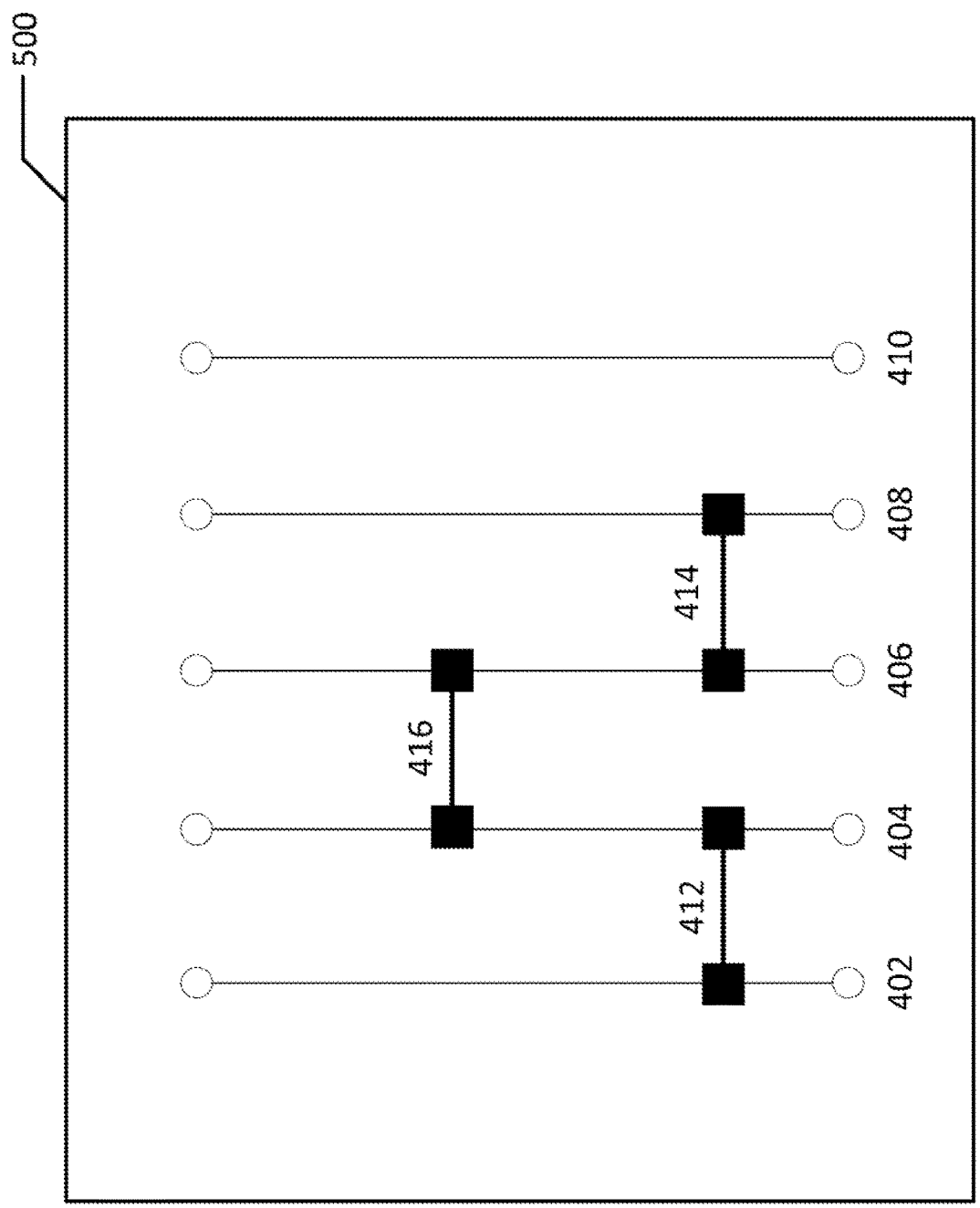

FIG. 5 illustrates a second example quantum program representing an example qubit set processable in accordance with at least some example embodiments of the present disclosure.

Figure 6:
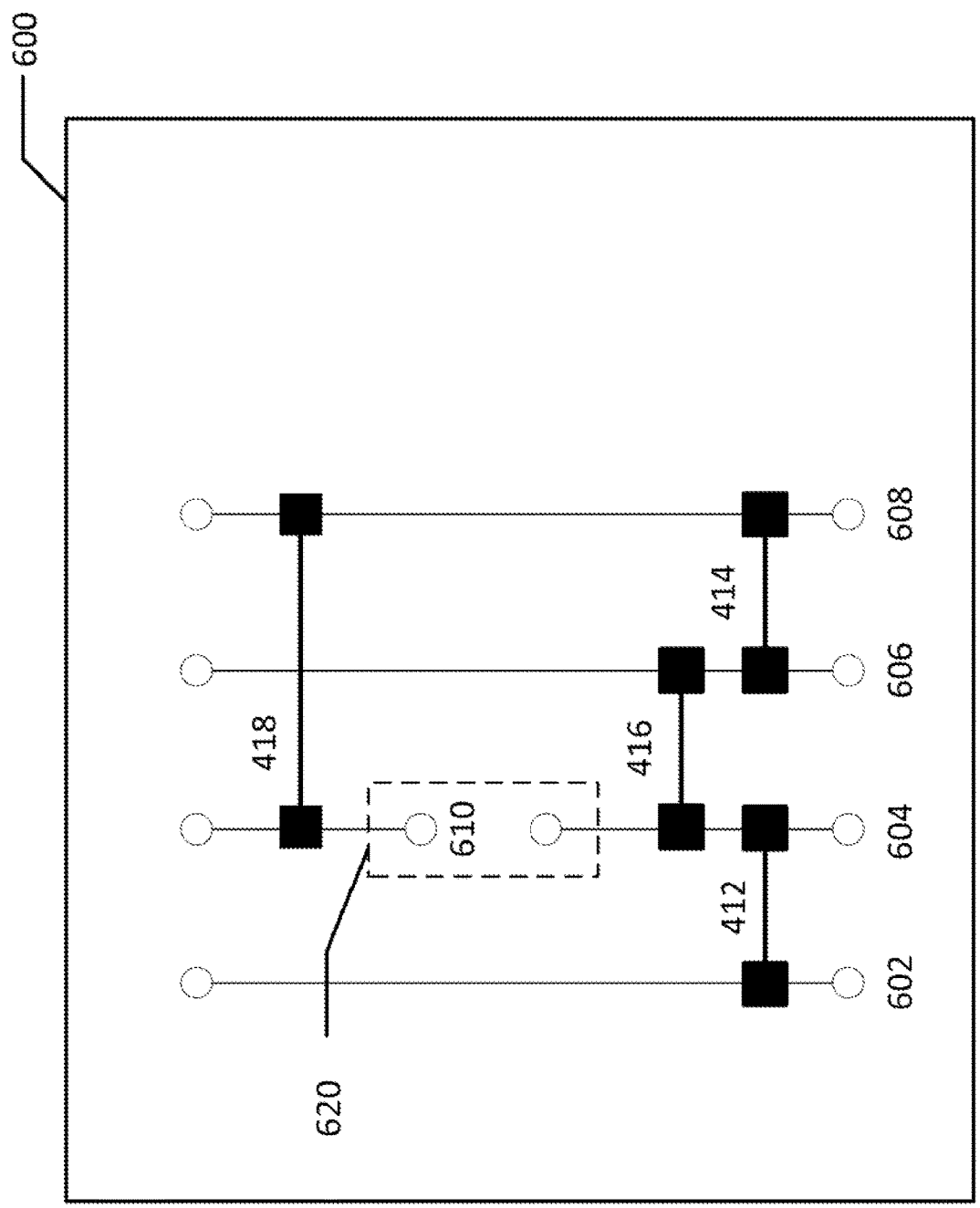

FIG. 6 illustrates a third example quantum program representing an example qubit set processable in accordance with at least some example embodiments of the present disclosure.

Figure 7:
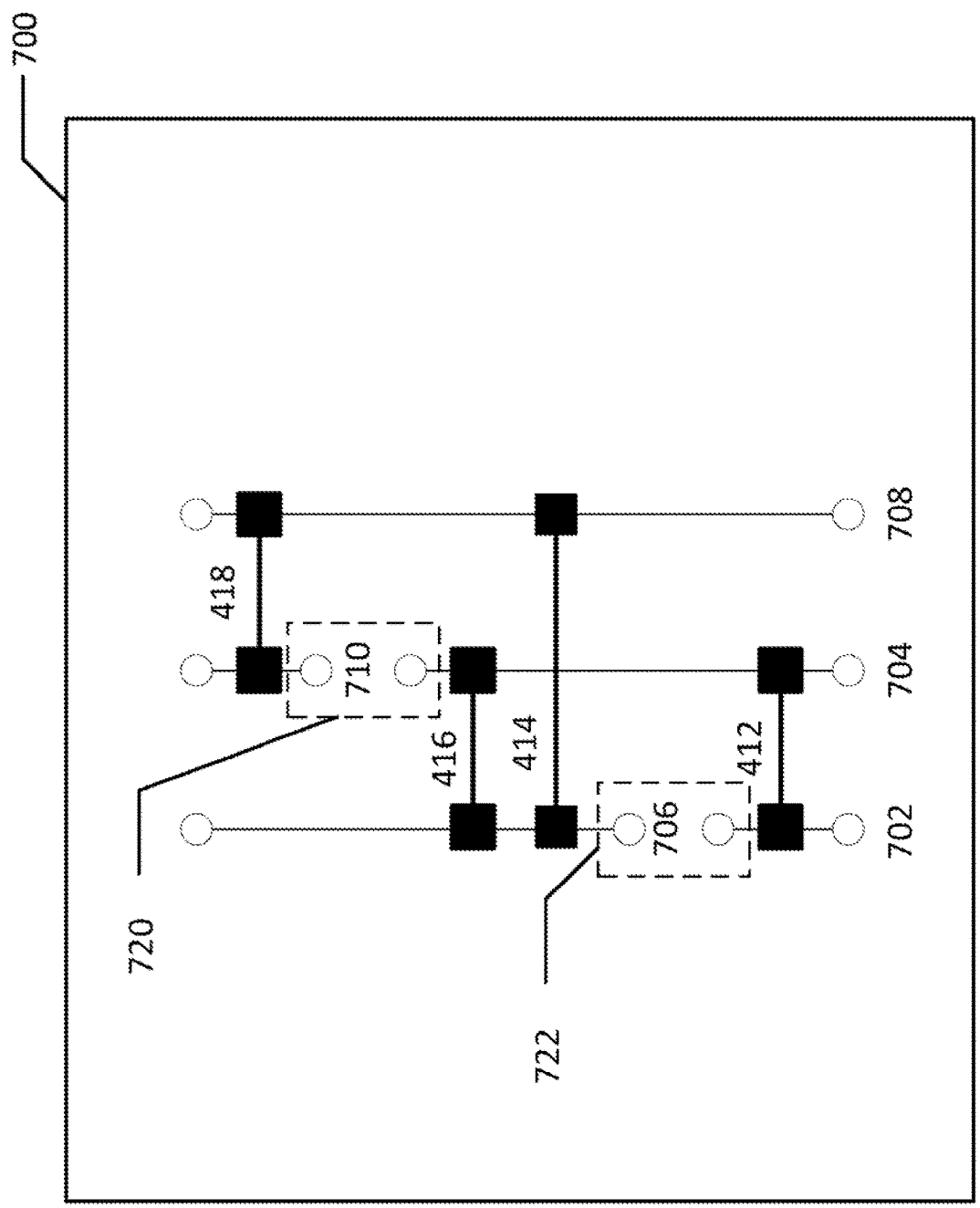

FIG. 7 illustrates a fourth example quantum program representing an example qubit set processable in accordance with at least some example embodiments of the present disclosure.

Figure 8:
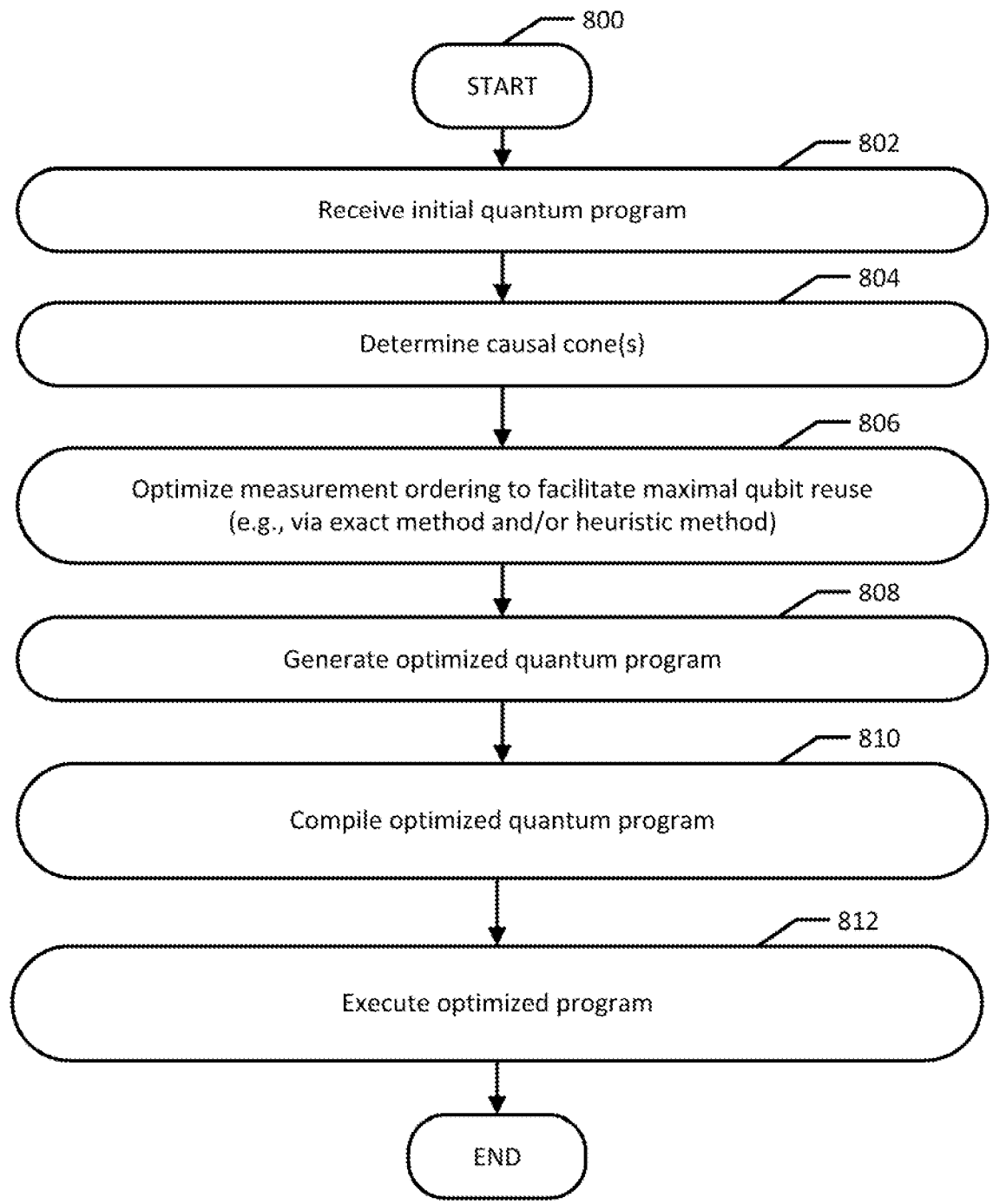

FIG. 8 illustrates an example flowchart of operations of an example process for quantum program optimization in accordance with at least some example embodiments of the present disclosure.

Figure 9:
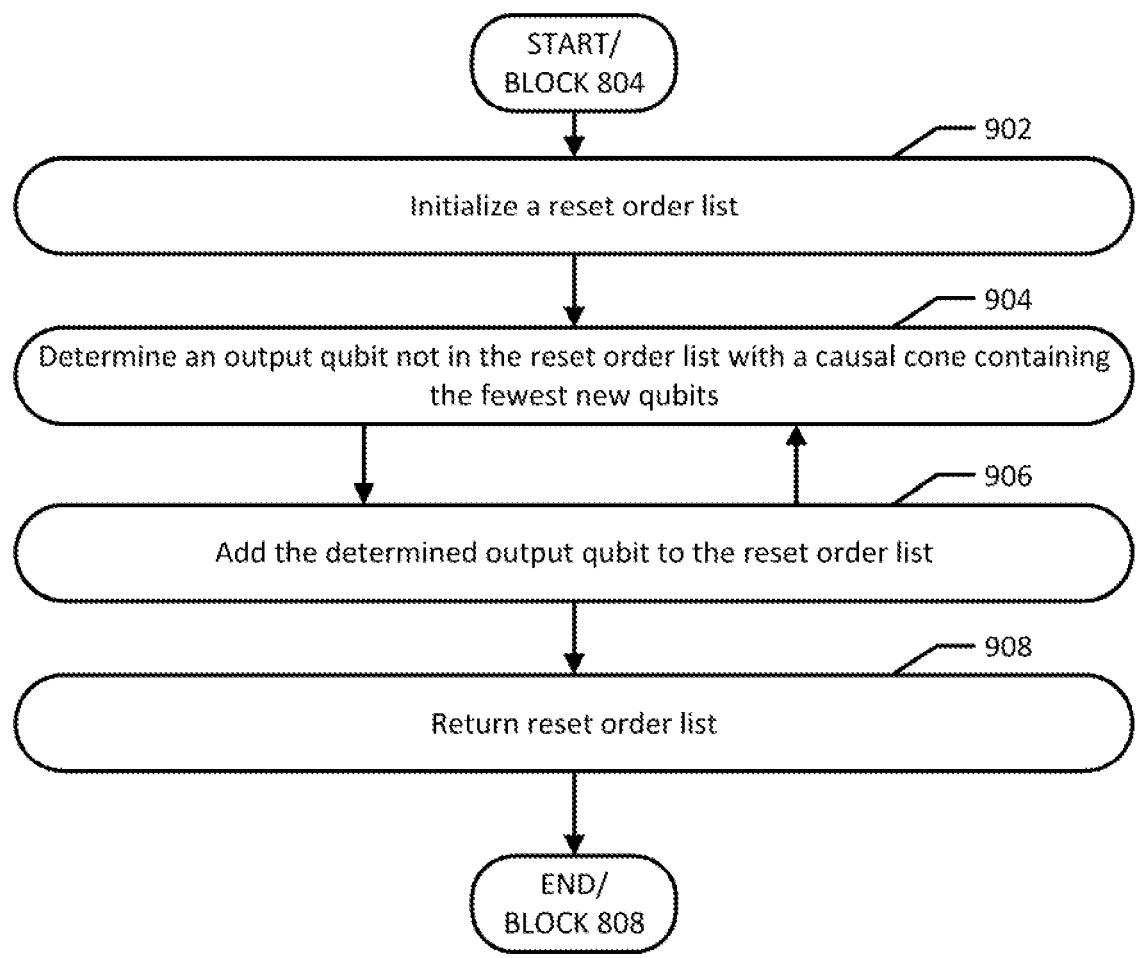

FIG. 9 illustrates an example flowchart of operations of an example process for quantum program optimization in accordance with at least some example embodiments of the present disclosure.

Figure 10A:
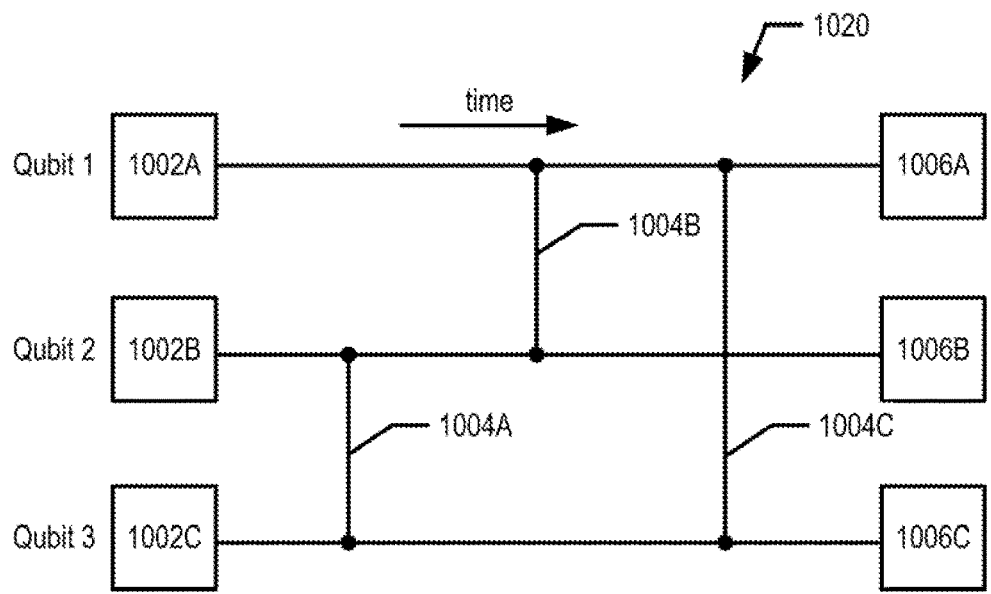

FIG. 10A illustrates a simple example quantum circuit.

Figure 10B:
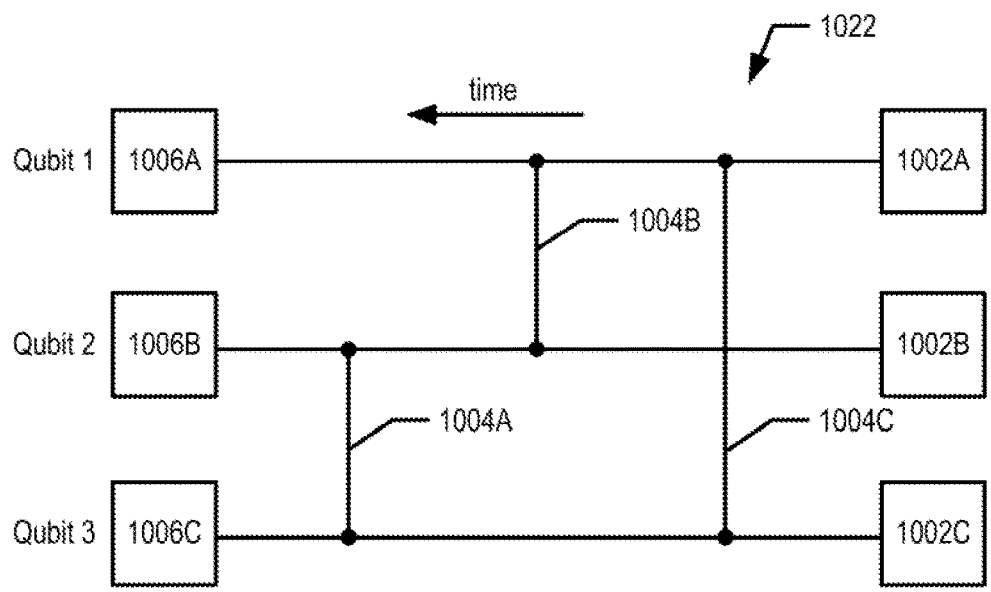

FIG. 10B illustrates the dual of the example quantum circuit illustrated in FIG. 10A, in accordance with an example embodiment.

Figure 11:
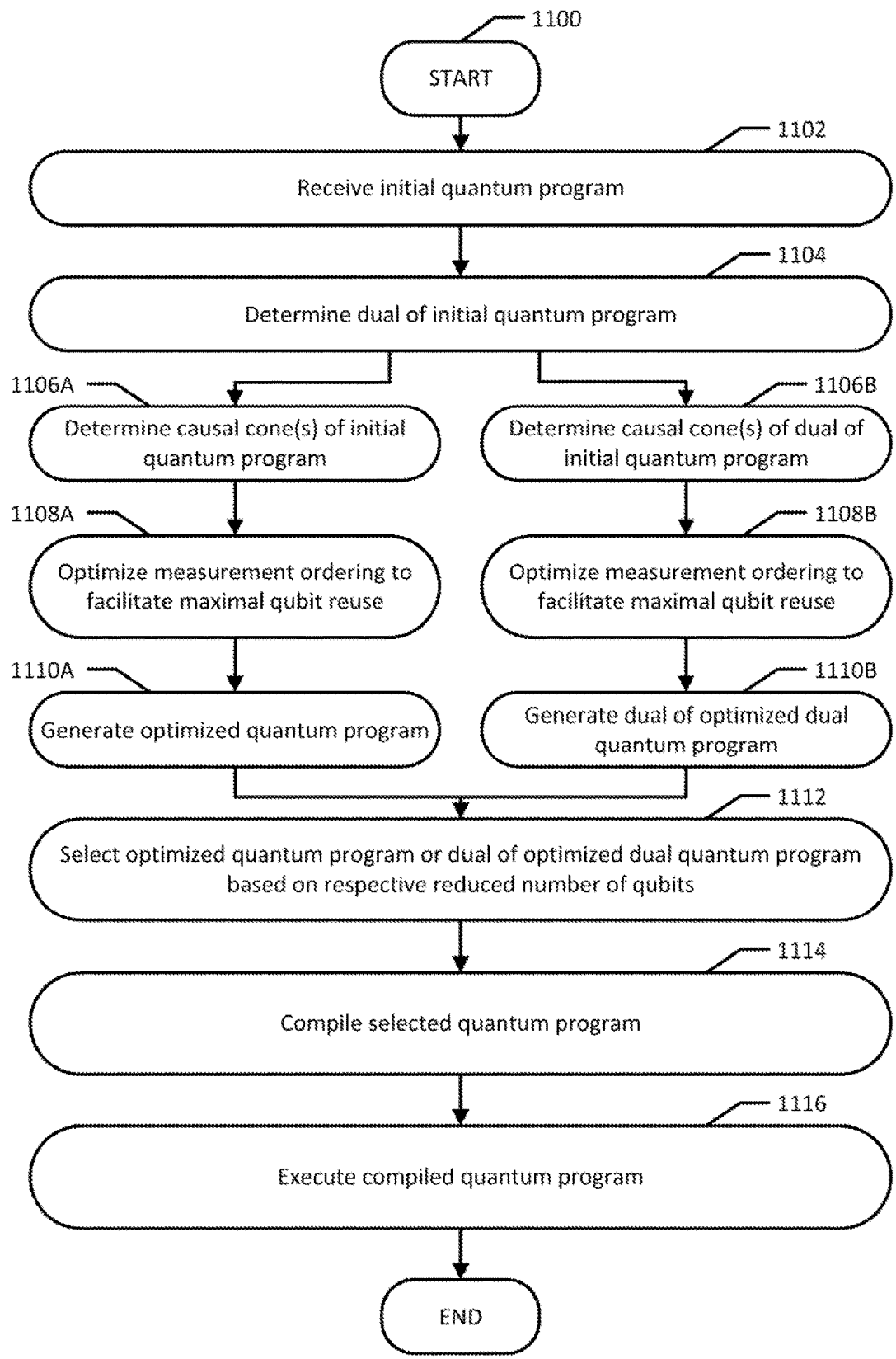

FIG. 11 an example flowchart of operations of an example process for quantum program optimization in accordance with at least some example embodiments of the present disclosure.

DETAILED DESCRIPTION

Embodiments of the present disclosure now will be described more fully with reference to the accompanying drawings, in which some, but not all, embodiments of the disclosure are illustrated. Indeed, embodiments of the disclosure may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like reference numbers in the drawings refer to like elements throughout.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Definitions

Although specific terms are employed herein, they are used in a generic and descriptive sense only and not for purposes of limitation.

The term "QCCD" refers to a quantum charge-coupled device architecture that enables qubit storage and positioning via a number of operations. Qubits in a QCCD move to specific location(s) on a chip to perform quantum operations (e.g., via gating). An example QCCD architecture uses atomic objects confined within an atomic object confinement apparatus, such as ions trapped within an ion trap, as qubits.

The term "quantum computing environment" refers to one or more computing devices configured to enable performance of quantum operations involving one or more qubits. Non-limiting examples of a computing environment include various QCCD trapped-ion quantum computers.

The term "qubit group" refers to one or more qubits for gating operation at a particular time.

The term "qubit set" refers to one or more data objects representing any number of qubits within a quantum computing environment.

The terms "quantum program" and "quantum circuit" refers to any number of gate operations to be performed utilizing one or more qubits in a quantum computing environment. A quantum program may include any number of gating operations performed on one or more qubits of the quantum computing environment. Each "gate," "logic gate," "gate operation," "gating operation," or "operation" of a quantum program involves a single qubit or a qubit group of more than one qubit.

The term "input qubit" refers to a qubit provided as input to a quantum circuit, and the term "output qubit" refers to a qubit produced as output by a quantum circuit. An input qubit and output qubit of a quantum circuit may physically be the same atomic object, though separated in time and possibly in different states due to the action of, for example, gate operations executed during a quantum program.

The term "causal cone" or "causal cone of an output qubit" refers to a set of input qubits in a quantum program that are causally connected to a particular output qubit. An input qubit is causally connected to an output qubit if there is a sequence of operations in the quantum program that causes the state of the output qubit to depend on the state of the input qubit. In addition to the set of input qubits, the term "causal cone" may also refer to the set of operations that connect these input qubits to the particular output qubit.

The term "causal cones of a quantum program" or "causal cones of a quantum circuit" refer to the one or more causal cones of all output qubits in the quantum program.

The term "initial quantum program" refers to a quantum program to be optimized, such as for qubit reuse.

The term "optimized quantum program" refers to a quantum program that has been optimized, such as for qubit reuse.

The term "initial input qubit set" refers to an input qubit set associated with an initial quantum program. The initial input qubit set may specify a number of atomic objects to be available for use as qubits.

The term "optimized input qubit set" refers to an input qubit set associated with an optimized quantum program. The optimized input qubit set may specify a number of atomic objects to be available for use as qubits.

Overview

Quantum computers, such as QCCD trapped-ion quantum computers, manipulate qubits for use in various computing actions. In one such context, quantum computers utilize qubits as inputs to one or more logic gates configured for performing logical operations based on the states of the input qubits. Configurations of logic gates may be combined in a myriad of ways in a quantum program, for example where the quantum program is specifically configured for reaching a desired result.

Execution of a quantum program (e.g., a quantum program embodying a quantum circuit of various logic gate operations to be performed) includes a multi-step process. For example, the process includes a scheduling step that selects a set of gates, which may include a preference for maximized parallel operations. The process includes a second, routing step that may move the qubits for the selected gate operations into gate zones. These steps may be repeated any number of times until all circuit operations are executed by the quantum computer.

Quantum computers may be limited by the number of available qubits to execute quantum programs. For example, in a QCCD trapped-ion quantum computer or other quantum computer that uses confined atomic objects as qubits, the number of atomic objects (e.g., ions, atoms, charged or neutral molecules, and/or the like) may be limited by the size and/or number of controlling elements/electrodes of the confinement apparatus used to confine the atomic objects. Regardless of how lengthy and/or complicated a quantum program may be, it is desirable to have the quantum computer perform in a manner that is as error-free and quick as possible in view of the available quantum computer resources, including the available number of qubits. The inventors have identified an optimization that minimizes the number of qubits to be used in a quantum program being executed on a quantum computer, where that quantum computer is capable of measuring output states of qubits and resetting qubits during a quantum program, such as during mid-calculation. In various embodiments, the optimizations may be heuristic methods as well as an optimization formulation.

In various embodiments, measurement of the state of a qubit may be executed when there are no longer any operations to be performed on a physical qubit, which may be referred to herein as a measurement operation. For example, when all of the operations of the causal cone for a given qubit have been performed, a measurement operation may be performed to read out and/or determine the state of the given qubit.

In various embodiments, resetting a qubit may be executed by causing a physical qubit to go to a specific qubit state, thereby reinitializing the qubit as an input to a quantum program, which may be referred to herein as a reset operation. For example, after a measurement operation has been performed on a given qubit and/or all of the operations of the causal cone for the given qubit have been performed, the given qubit may be reset and then re-used in performing the quantum program.

In various embodiments, such optimization may be described as rewriting an initial quantum program into an optimized quantum program, in which the order in which qubits are used and/or reused has been optimized. For example, an initial quantum program may be rewritten by determining an order in which gate operations are performed such that the causal cone of a given qubit may be performed or executed, a measurement operation can be performed on the given qubit, if required by the quantum program, and a reset operation can be performed on the given qubit such that atomic object, for example, that embodied the given qubit can be reintroduced into the quantum program as a new qubit.

Embodiments of the present disclosure allow for practical implementations to reduce the number of qubits required to execute a quantum program and, thus, provide a number of improvements associated with reducing the computation requirements to execute a quantum program.

Additionally or alternatively, embodiments of the present disclosure provide a myriad of technical advantages in the field of quantum computing. For example, some embodiments of the present disclosure reduce the number of qubits required to execute a quantum program, thus allowing an optimized quantum program to be executed by a quantum computer that may have less qubits available than required by the initial quantum program. Additionally or alternatively still, some embodiments of the present disclosure may allow a quantum computer to solve larger and/or more complicated problems, by virtue of the aforementioned ability to execute quantum programs using a reduced number of qubits.

Example Systems and Apparatuses

FIG. 1 provides a schematic diagram of an example quantum computing environment comprising quantum computing system 100 where the quantum processor comprises an atomic object confinement apparatus 120 (e.g., an ion trap and/or the like) having a plurality of atomic objects (e.g., atoms, ions, and/or the like) confined therein, in accordance with an example embodiment.

In various embodiments, the quantum computing system 100 comprises a computing entity 10 and a quantum computer 110. In various embodiments, the quantum computer 110 comprises a quantum system controller 30, which may be referred to as controller 30, and a quantum processor 115. In various embodiments, the quantum system controller 30 is configured, programmed, and/or the like to control the quantum processor 115. In an example embodiment, the quantum processor 115 comprises a plurality of qubits (e.g., data qubits that may be organized into logical qubits, ancilla qubits, and/or the like). In various embodiments, the quantum computer 110 includes or communicates with databases (not shown) described herein. For example, the databases may be stored by one or more computing entities 10 that are in communication with the controller 30 via one or more wired and/or wireless networks 20 and/or stored by memory local to the controller 30.

In various embodiments, the quantum processor 115 comprises means for controlling the evolution of quantum states of the qubits. For example, in an example embodiment, the quantum processor 115 comprises a cryostat and/or vacuum chamber 40 enclosing a confinement apparatus 120 (e.g., an ion trap), one or more manipulation sources 60, one or more voltage sources 50, and/or one or more optics collection systems 70. For example, the cryostat and/or vacuum chamber 40 may be a temperature and/or pressure-controlled chamber. In an example embodiment, the manipulation signals generated by the manipulation sources 60 are provided to the interior of the cryostat and/or vacuum chamber 40 (where the atomic object confinement apparatus 120 is located) via corresponding optical paths 66 (e.g., 66A, 66B, 66C). In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within the confinement apparatus. In various embodiments, the atomic objects within the atomic confinement apparatus (e.g., ions trapped within an ion trap) act as the data qubits and/or ancilla qubits of the quantum processor 115 of the quantum computer 110. For example, in an example embodiment, wherein the one or more manipulation sources 60 comprise one or more lasers, the lasers may provide one or more laser beams to atomic objects trapped within the confinement apparatus 120 within the cryostat and/or vacuum chamber 40. For example, the manipulation sources 60 may generate and/or provide laser beams configured to ionize atomic objects, initialize atomic objects within the defined two state qubit space of the quantum processor, perform gates one or more qubits of the quantum processor, read a quantum state of one or more qubits of the quantum processor, and/or the like.

In various embodiments, the quantum computer 110 comprises an optics collection system 70 configured to collect and/or detect photons generated by qubits (e.g., during reading procedures, such as measurement operations). The optics collection system 70 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer 110. In various embodiments, the detectors may be in electronic communication with the quantum system controller 30 via one or more A/D converters 225 (see FIG. 2) and/or the like.

In various embodiments, the quantum computer 110 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 120, in an example embodiment. Varying the electrical potential(s) may move the ions between locations or states. In various embodiments, how to vary the electrical potential(s) may be defined by waveforms that specify one or more voltages to apply over a period of time. In various embodiments, the one or more voltage source 50 may be coupled to electrodes via circuitry. In various embodiments, the circuitry coupling the voltage sources 50 the electrodes may be located outside the cryostat and/or vacuum chamber 40, inside the cryostat and/or vacuum chamber 40, or both inside and outside the cryostat and/or vacuum chamber 40. In various embodiments, the circuitry coupling the voltage sources 50 to the electrodes will be comprised of circuit components capable of and/or configured to operate at the temperatures for their location, such as those in the cryostat and/or vacuum chamber, which may have temperatures below 4 Kelvin.

In some embodiments the computing entity 10 embodies one or more computing devices embodied in hardware, software, firmware, and/or any combination thereof. The computing entity 10 may be embodied by a user device configured to provide various functionality. In this regard, the computing entity 10 may embody a conventional computing environment that interacts with the quantum computer 110. Non-limiting examples of a computing entity 10 include a specially configured mobile device, tablet, smartphone, personal computer, laptop, enterprise terminal, and/or the like. In some embodiments, the computing entity 10 is configured entirely by specially configured software application(s) installed to and/or otherwise executable via the computing entity 10 to provide various functionality for accessing and/or otherwise controlling the quantum computer 110 as described herein. In various embodiments, the computing entity 10 is a conventional and/or classical computer.

In some embodiments, the computing entity 10 includes specially configured hardware, software, firmware, and/or a combination thereof, that enables access to and/or configuration of the quantum computer 110. In some embodiments, the computing entity 10 provides access to functionality for generating and/or retrieving a quantum program for execution via the controller 30 of the quantum computer 110. In this regard, the computing entity may receive one or more user input(s) for constructing and/or that otherwise embody a quantum program to be executed. For example, a user of the computing entity 10 may interact with the computing entity 10 to construct a quantum circuit, store the quantum circuit, and submit the quantum circuit for execution via the controller of the quantum computer 110. In some embodiments, the computing entity 10 is embodied by a user-facing device of the quantum computer 110, for example such that communications can occur without requiring the network 20.

Additionally or alternatively, in some embodiments, the computing entity 10 enables user input and/or output for accessing the quantum computer 110 to execute a quantum program. In some embodiments, the computing entity 10 communicates with one or more computing devices of the quantum computer 110, such as a controller 30, which may generate and/or compile instructions for executing via a quantum computer 110.

Additionally or alternatively, a computing entity 10 is configured to allow a user to provide input to the quantum computer 110 (e.g., via a user interface of the computing entity 10) and receive, view, and/or the like output from the quantum computer 110.

In an example embodiment, the computing entity 10 may translate, configure, format, and/or the like information/data, quantum computing algorithms, quantum program, and/or the like into a computing language, executable instructions, command sets, and/or the like that the quantum system controller 30 can understand and/or implement. In various embodiments, one or more device(s) of the quantum computer 110 (e.g., controller 30) receive data from the computing device entity 10 that embodies the quantum program, instructions to be performed to manipulate the quantum computer, and/or the like. In various embodiments the computing entity may optimize a quantum program to generate an optimized quantum program, such as those described herein.

Additionally or alternatively, in various embodiments, the controller 30 may receive the quantum program from the computing entity 10 and compile it to produce control system instructions embodying hardware manipulation instructions or machine code level commends configured to, when executed, cause the execution of the quantum program on a quantum computer. In various embodiments, the execution of a quantum program may include providing and/or controlling voltages to one or more electrodes. In various embodiments, the controller 30 may optimize a quantum program to generate an optimized quantum program, such as those described herein.

In various embodiments, the controller 30 is embodied by one or more computing devices external from but communicable with the quantum computer 110. For example, the controller 30 may be embodied by a circuit compiler embodied in a dedicated computing system embodied in hardware, software, firmware, and/or a combination thereof internal or external to the quantum computer 110, dedicated hardware communicable with a quantum computer 110, software executing on a computing system communicable with the quantum computer 110, and/or the like.

In various embodiments, the controller 30 may embody a conventional computing system, for example specially configured via one or more specialized software application(s) to execute one or more process(es) that determine positions for the qubits at various time steps and/or instructions for repositioning the qubits to such position. For example, the controller 30 may determine position assignments for each qubit at various time steps, and/or instructions embodying gate and/or swap operations, which may cause the qubits to reach specific positions at each of the appropriate time steps.

In various embodiments, the quantum system controller 30 is configured to control the voltage sources 50, cryostat system and/or vacuum system controlling the temperature and pressure within the cryostat and/or vacuum chamber 40, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the confinement apparatus. For example, the quantum system controller 30 may cause a controlled evolution of quantum states of one or more atomic objects within the confinement apparatus to execute a quantum program. For example, the quantum system controller 30 may cause a reading procedure (e.g., measurement operation) comprising coherent shelving to be performed, possibly as part of executing a quantum program. Additionally, the quantum system controller 30 is configured to communicate and/or receive input data from the optics collection system 70 and corresponding to the reading of the quantum state of qubits of the quantum computer 110. In various embodiments, the atomic objects confined within the confinement apparatus are used as qubits of the quantum computer 110.

In various embodiments, the quantum system controller 30 is further configured to control a cryostat system and/or vacuum system controlling the temperature and pressure within the cryostat and/or vacuum chamber 40, cooling system, and/or other systems controlling the environmental conditions (e.g., temperature, humidity, pressure, and/or the like) within the cryostat and/or vacuum chamber 40.

FIG. 2 provides a schematic diagram of an example quantum system controller 30, which may comprise various quantum system controller elements including processing element(s) 205, memory 210, driver controller elements 215, a communication interface 220, analog-digital (A/D) converter elements 225, and/or the like. In various embodiments, the quantum system controller 30 is configured to receive input data, including input data generated by the optics collection system via the A/D converter(s) 225. In various embodiments, the processing element(s) 205 are configured to operate as described herein.

In various embodiments, the processing element(s) 205 comprise processing elements such as programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing elements and/or circuitry, and/or the like. The term circuitry may refer to an entirely hardware embodiment or a combination of hardware and computer program products. In an example embodiment, a processing element 205 of the quantum system controller 30 comprises a clock and/or is in communication with a clock.

In various embodiments, the memory 210 comprises non-transitory memory such as volatile and/or non-volatile memory storage such as one or more of hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

In various embodiments, the memory 210 may store a queue of commands to be executed to cause a quantum program to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized quantum system controller language(s), and/or the like), and/or the like. In an example embodiment, execution of at least a portion of the computer program code stored in the memory 210 (e.g., by a processing element 205) causes the quantum system controller 30 to perform one or more steps, operations, processes, procedures and/or the like for generating one or more sets of commands configured to cause the quantum processor 115 to perform at least a portion of a quantum circuit; to update one or more qubit registries; and/or the like. In an example embodiment, execution of at least a portion of the computer program code stored in the memory 210 causes the quantum system controller 30 to cause one or more commands to be performed.

In various embodiments, the driver quantum system controller elements 215 include one or more drivers and/or quantum system controller elements each configured to control one or more drivers. In various embodiments, the driver quantum system controller elements 215 may comprise drivers and/or driver controllers. For example, the driver controllers may be configured to cause one or more corresponding drivers to be operated in accordance with executable instructions, commands, and/or the like generated, scheduled. and executed by the quantum system controller 30. For example, the processing element 205 may generate one or more commands to be performed by a first driver.

In various embodiments, the driver controller elements 215 enable the quantum system controller 30 to operate a voltage sources 50, manipulation sources 60, cooling system, vacuum systems, and/or the like. In various embodiments, the drivers may be drivers for controlling the flow of current and/or voltage applied to electrodes (e.g., configured to operate and/or control one or more voltage sources 50) used for maintaining and/or controlling the trapping potential of the confinement apparatus 120 (and/or other drivers for providing driver action sequences to potential generating elements of the confinement apparatus); laser drivers (e.g., configured to operate and/or control one or more manipulation sources 60); vacuum component drivers; cryostat and/or vacuum system component drivers; cooling system drivers, and/or the like.

In various embodiments, each of driver controller elements 215 correspond to an endpoint within the system (e.g., a component of a manipulation source 60, a component of a voltage source 50 (radio frequency voltage sources, arbitrary waveform generators (AWG), direct digital synthesizer (DDS), and/or other waveform generator), a component of a cooling and/or vacuum system, a component of the optics collection system 70, and/or the like). Each endpoint within the quantum computer 110 represents an individual hardware control. Each endpoint may have its own set of accepted micro-commands, in various embodiments. Examples include but are not limited to a voltage source 50 such as a direct digital synthesizer (DDS), component of an optics collection system 70 such as a photomultiplier tube (PMT), a component of a manipulation source 60 such as a laser driver and/or optical modulator switch, and/or general-purpose output (GPO). Individual commands for a DDS allow for setting power level, frequency and phase of a controlling signal generated thereby. Commands for a PMT interface include start/stop photon count and reset of count, in various embodiments. Commands for a GPO endpoint include setting and/or clearing one or more output lines. These output lines can be used to control external hardware in a manner synchronized with the execution of a quantum circuit.

In various embodiments, the quantum system controller 30 comprises means for communicating and/or receiving signals from one or more optical receiver components (e.g., of the optics collection system 70). For example, the quantum system controller 30 may comprise one or more analog-digital (A/D) converter elements 225 configured to receive signals from one or more optical receiver components (e.g., a photodetector of the optics collection system 70), calibration sensors, and/or the like. In various embodiments, the A/D converter elements 225 are configured to write the input data generated by converting the received signals generated by one or more optical receiver components of the optics collection system 70 to memory 210.

In various embodiments, the quantum system controller 30 may comprise a communication interface 220 for interfacing and/or communicating with, for example, a computing entity 10. For example, the quantum system controller 30 may comprise a communication interface 220 for receiving executable instructions, command sets, and/or the like from the computing entity 10 and providing output received from the quantum computer 110 (e.g., from an optics collection system 70) and/or the result of a processing the output to the computing entity 10. In various embodiments, the computing entity 10 and the quantum system controller 30 may communicate via a direct wired and/or wireless connection and/or via one or more wired and/or wireless networks 20.

In various embodiments, the quantum system controller 30 may be configured to optimize a quantum program by determining the order in which one or more qubits may be used or reused. For example, and as described herein, the controller 30 may receive or identify an initial quantum program. In various embodiments, the quantum program may be associated with or represented by an initial qubit set that may be associated with one or more atomic objects. In various embodiments, the total number of qubits in the initial qubit set may be equal to a number of atomic objects the quantum program may use as qubits. Additionally or alternatively, in some embodiments, the controller 30 generates an optimized quantum program associated with the initial quantum program, and the optimized quantum program may be associated with the same initial qubit set or an optimized qubit set, which may contain less qubits than the initial qubit set and may have the optimized qubit set associated with fewer atomic objects than the initial qubit set is associated with.

FIG. 3 provides an illustrative schematic representative of an example computing entity 10 that can be used in conjunction with embodiments of the present disclosure. In various embodiments, a computing entity 10 is a classical (e.g., semiconductor-based) computer configured to allow a user to provide input to the quantum computer 110 (e.g., via a user interface of the computing entity 10) and receive, display, analyze, and/or the like output from the quantum computer 110. In various embodiments, a user may use computing entity 10 to provide input to the quantum computer 110, such as when a user may provide input that results in a quantum program being created and/or executed.

As shown in FIG. 3, a computing entity 10 can include an antenna 312, a transmitter 304 (e.g., radio), a receiver 306

(e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a quantum system controller 30, other computing entities 10, and/or the like. The computing entity 10 can include a network interface 320, which may provide signals to and receive signals in accordance with an interface standard of applicable network systems to communicate with various entities, such as a quantum system controller 30, other computing entities 10, and/or the like.

In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via such communication standards and protocols, the computing entity 10 may communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 may also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 322 and/or non-volatile storage or memory 324, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Example Data Visualizations

Having described example system and apparatus architectures in accordance with the present disclosure, example visualizations of data maintained and/or processed in accordance with the present disclosure are described below. It should be appreciated that the data visualizations depicted in each of the following figures may be embodied in any number of ways. For example, various embodiments may maintain the depicted data in any number of data objects configured to enable storage and/or manipulation of such data objects to perform the various functionality described herein.

In the following illustrations of visualizations of quantum programs (e.g., quantum circuit diagrams), each atomic object to be used as a qubit is depicted with its lifetime illustrated vertically. In the illustrated embodiments of FIG. 4 and FIG. 5, the quantum computing environments depicted include five atomic objects to be used as qubits. In the illustrated embodiment of FIG. 6, the quantum computing environment depicted includes four atomic objects to be used as qubits. In the illustrated embodiment of FIG. 7, the quantum computing environment illustrated includes three atomic objects to be used as qubits. In various embodiments, one atomic object (e.g., an ion) may be used as one or more qubits.

In the illustrated visualizations, a circumstance where a first qubit is to be gated with another, second qubit of the qubit set, the first qubit and second qubit are connected with a horizontal line and a box or connector to the vertical lines for each of the two qubits that represents the gate to performed.

It should be appreciated that, in some embodiments, qubit groups may be required to be gated in the order depicted from their initialization to their output (e.g., from bottom to top), which may correspond to an initialization state at the bottom and an output state at the top. In other embodiments, qubit groups may be gated in any order, so long as the qubit groups that share at least one qubit are performed in a manner that satisfies the order of execution defined in the quantum program (e.g., bottom to top as depicted).

FIG. 4 illustrates an example visualization of a quantum program representing an example qubit set processable in accordance with at least some example embodiments of the present disclosure. As illustrated in FIG. 4, the visualization of the quantum program 400 depicts qubit groups to be gated to perform logical operations. The visualization illustrates how qubits are provided as input to a quantum program (at the bottom of the visualization), operations are performed on the qubits, and then the qubits are returned as output of the quantum program (at the top of the visualization).

In the depicted visualization of the quantum program 400, there are five atomic objects to be used as qubits, which are depicted with reference numbers 402, 404, 406, 408, 410. For example, a first atomic object tracked by a first qubit register is designated q0 (e.g., 402), a second atomic object tracked by a second qubit register is designated q1 (e.g., 404), a third atomic object tracked by a third qubit register is designated q2 (e.g., 406), a fourth atomic object tracked by a fourth qubit register is designated q3 (e.g., 408), and a fifth atomic object tracked by a fifth qubit register is designated q4 (e.g., 410). In FIG. 4, operations performed on the qubits are represented as occurring in order from bottom to top of the illustration. A qubit at the bottom of the illustration represents a qubit in its input state (e.g., as an input for a quantum program) and a qubit at the top of the illustrations represents a qubit in its output state (e.g., as an output of the quantum program). For example, qubit q1 has two operations performed on it, first operation 412 and second operation 416, before it would be in its output state.

For the quantum program 400 of FIG. 4, the five qubits q0, q1, q2, q3, and q4 are the initial qubit set to execute quantum program 400. The quantum program 400 consists of four operations, illustrated at reference numbers 412, 414, 416, and 418, which may be, for example, gate operations. Reference number 412 illustrates an operation performed on qubit q0 (e.g., 402) and qubit q1 (e.g., 404). Similarly, reference number 414 illustrates an operation performed on qubit q2 (e.g., 406) and qubit q3 (e.g., 408), reference number 416 illustrates an operation performed on qubit q1 (e.g., 404) and qubit q2 (e.g., 406), and reference number 418 illustrates an operation performed on qubit q3 (e.g., 408) and qubit q4 (e.g., 410). After all of the operations are performed, quantum program 400 is complete and the five qubits q0, q1, q2, q3, and q4 are in their respective output states and, in various embodiments, these states may be referred to as output qubits.

As illustrated, due to the quantum operations executed in, for example, quantum program 400, each output qubit is causally dependent on a set of input qubits to the quantum program 400. In various embodiments where quantum program 400 may be an initial quantum program, each output qubit may be an initial output qubit, and each initial output qubit may be associated with an initial input qubit set, such as due to the causal dependency. In various embodiments, more than one of the initial output qubits may collectively be an initial output qubit set where each initial output qubit in the initial output qubit set is respectively associated with its own initial input qubit set.

FIG. 5 illustrates an example visualization of quantum program 500, which in various embodiments may be a modification of the quantum program 400 to demonstrate one example of the causal dependency between output qubit q1 (e.g., 404) and a subset of input qubits to quantum program 400 that comprise the associated initial qubit set to output qubit q1. The quantum program 500 is the portion of quantum program 400 that results in the qubit q1 obtaining an output state. For example, quantum program 500 illustrates the causal cone of qubit q1 for the quantum program 400.

As illustrated in FIG. 5 of quantum program 500, there are five atomic objects to be used as qubits (e.g., 402, 404, 406, 408, and 410) and the initial qubit set consist of five qubits, qubit q0 (e.g., 402), qubit q1 (e.g., 404), qubit q2 (e.g., 406), qubit q3 (e.g., 408), and qubit q4 (e.g., 410). As illustrated in FIG. 5, only four qubits are associated with operations 412, 414, and 416. For example, the causal cone of qubit q1 does not include any interactions with qubit q4. In various embodiments, at a first time, operation 412 is executed on qubit q0 (e.g., 402) and qubit q1 (e.g., 404) and operation 414 is executed on qubit q2 (e.g., 406) and qubit q3 (e.g., 408).

In various embodiments, operation 412 may occur before or after operation 414. Subsequent to operations 412 and 414, operation 416 is executed on qubit q1 (e.g., 404) and qubit q2 (e.g., 406). After operations 412, 414, and 416 have been executed, qubit q1 (e.g., 404) is in its output state. Thus, the output state of qubit q1 (e.g., 404) is causally dependent on operations 412, 414, and 416, which were executed on qubits q0, q1, q2, and q3. As output qubit q1 is causally dependent only on input qubits q0, q1, q2, and q3, this means that only four qubits (i.e., q0, q1, q2, and q3) are needed to produce the output state of qubit q1. Such dependencies along with the associated operations may be referred to as a causal cone.

In other embodiments (not illustrated), the causal cone of each of the output qubits may be determined. For example, and using the illustration in FIG. 4, the causal cone of qubit q4 (e.g., 410) may be determined from the output state of qubit q4 in view of the initial qubit set as well as the operations of the quantum program 400. For qubit q4 of quantum program 400, the causal cone includes qubit q2 (e.g., 406), qubit q3 (e.g., 408), and qubit q4 (e.g., 410) along with operations 414 and 418.

In various embodiments with five or more qubits, quantum program 400 and quantum program 500 may be executed on the available qubits. However, other embodiments may not have five or more qubits or, alternatively, may not have five qubits available to execute quantum program 400 or quantum program 500. Thus the quantum program 400 or quantum program 500 may be optimized to, among other things, utilize fewer qubits. The utilization of fewer qubits may be available when a qubit of a quantum computer 110 may be measured, reset, and/or reused, such as with measurement operations and reset operations. In various embodiments, this may occur by executing measurements, resets, and reuse of qubits in the middle of a quantum program.

FIG. 6 illustrates an example visualization of quantum program 600, which may be an optimization of quantum program 400, which demonstrates one embodiment of an optimization. The quantum program 600 is an optimization of quantum program 400 that allows quantum program 400 to be executed on a quantum computer 110 having four qubits available to execute a quantum program.

As illustrated in FIG. 6 of quantum program 600, there are four atomic objects to be used as qubits (e.g., 602, 604, 606, and 608) and initial qubit set consist of four qubits. For example, a first atomic object tracked by a first qubit register is designated q0 (e.g., 602), a second atomic object tracked by a second qubit register is designated q1 (e.g., 604) and re-initialized and/or reset to q4 (e.g., 610), a third atomic object tracked by a third qubit register is designated q2 (e.g., 606), and a fourth atomic object tracked by a fourth qubit register is designated q3 (e.g., 608). The quantum program 600 includes the same four operations as quantum program 400 (i.e., operations 412, 414, 416, and 418). In quantum program 600, however, there is an operation 620 that measures the output state of qubit q1 and resets qubit q1 (e.g., 604) to qubit q4 (e.g., 610). FIG. 6 illustrates that this is the same atomic object with the vertical line that relates the atomic object.

In various embodiments, and as illustrated in FIG. 6, at a first time, operation 412 is executed on qubit q0 (e.g., 602) and qubit q1 (e.g., 604) and operation 414 is executed on qubit q2 (e.g., 606) and qubit q3 (e.g., 608). In other embodiments, operation 412 may occur before or after operation 414. Subsequent to operations 412 and 414, operation 416 is executed on qubit q1 (e.g., 604) and q2 (e.g., 606). After operations 412, 414, and 416 have been executed, qubit q0 (e.g., 602), qubit q1 (e.g., 604), and qubit q2 (e.g., 606) are in their respective output states. Quantum program 600, however, is not complete as operation 418 is to be executed on qubit q3 (e.g., 608) and qubit q4 (not available prior to operation 620). To execute operation 418, qubit q1 (e.g., 604) will be, at operation 620, measured for its output state before being reset and reused as qubit q4 (e.g., 610). After operation 620, the quantum program 600 proceeds with operation 418, which results in qubit q3 (e.g., 608) and qubit q4 (e.g., 610) being in their respective output states, which may be measured. Thus, in this example, the output states of qubits q0, q1, q2, q3, and q4 may be measured and, thus, the output states of each qubit measurement have occurred the same as in quantum program 400.

It will be appreciated the example of quantum program 600 is one example of an optimization of quantum program 400 and that in other embodiments the measurement, reset, and reuse of one or more qubits may occur at other points in the quantum program 400. It will be further appreciated that optimization may be of an entire quantum program or for a portion of a quantum program. For example, an entire quantum program could be broken into subroutines, program portions, and/or the like where measurements may occur, such as of an output state of a qubit, and the quantum program may be optimized for each subroutine. Such optimization may be advantageous where a quantum program may need a measurement of a qubit as input into another portion of the quantum program. Such inputs may include, but are not limited to, checks that the program is executing correctly, determinations of accumulated qubit phases, and/or the like.

FIG. 7 illustrates an example visualization of quantum program 700, which may be an optimization of quantum program 400 or an optimization of quantum program 600. Quantum program 700 demonstrates one embodiment of an optimization of each of these quantum programs. The quantum program 700 is an optimization that allows quantum program 400 or quantum program 600 to be executed on a quantum computer 110 having three atomic objects for use as qubits to execute a quantum program.

As illustrated in FIG. 7 of quantum program 700, there are three atomic objects to be used as qubits (e.g., 702, 704, and 708) and initial qubit set consists of three qubits. For example, a first atomic object tracked by a first qubit register is designated q0 (e.g., 702) and re-initialized and/or reset to q2 (e.g., 706), a second atomic object tracked by a second qubit register is designated q1 (e.g., 704) and re-initialized and/or reset to q4 (e.g., 710), and a third atomic object tracked by a third qubit register is designated q2 (e.g., 608). Quantum program 700 includes the same four operations (i.e., operations 412, 414, 416, and 418) as quantum program 400. The output states of each qubit measurement also occurs the same as in quantum program 400. In quantum program 700, however, there are two operations (e.g., operation 720 and operation 722) that reset qubits (e.g., qubit q0 (e.g., 702) to qubit q2 (e.g., 706); and qubit q1 (e.g., 704) to qubit q4 (e.g., 710)). FIG. 7 illustrates that these are the same atomic objects with the vertical lines that respectively relate to each of the atomic objects.

In various embodiments, and as illustrated in FIG. 7, at a first time, operation 412 is executed on qubit q0 (e.g., 702) and qubit q1 (e.g., 704). After operation 412 has been executed, qubit q0 (e.g., 702) is in its output state. At operation 722, qubit q0 (e.g., 702) is measured for its output state before being reset and reused as qubit q2 (e.g., 706). After operation 722, operation 414 is executed on qubit q2 (e.g., 706) and qubit q3 (e.g., 708). After operation 414, operation 416 is executed on qubit q2 (e.g., 706) and qubit q1 (e.g., 704). After operation 416 has been executed, qubit q1 (e.g., 704) and qubit q2 (e.g., 706) are in their output states. In the embodiment illustrated in FIG. 7, at operation 720, qubit q1 (e.g., 704) is measured for its output state before being reset and reused as qubit q4 (e.g., 710). After operation 720, operation 418 is executed on qubit q4 (e.g., 710) and qubit q3 (e.g., 708). After operation 418 has been executed, qubit q4 (e.g., 710) and qubit q3 (e.g., 708) are in their output states, which may be measured.

Thus, in this example, the output states of qubits q0, q1, q2, q3, and q4 may be measured and, thus, the output states of each qubit measurement have occurred the same as in quantum program 400 and quantum program 600.

Example Optimization Processes

Having described example systems, apparatuses, computing environments, and data visualizations of the disclosure, example processes in accordance with the present disclosure will now be described. It will be appreciated that each of the flowcharts depicts an example computer-implemented process that may be performed by one or more of the apparatuses, systems, devices, and/or computer program products described herein, for example utilizing one or more of the specially configured components thereof.

The blocks depicted in the flowcharts indicate operations. Such operations may be executed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process, such as being repeated to perform the block in one or more iterations. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Similarly, it should be appreciated that one or more of the operations of each flowchart may be combinable, replaceable, and/or otherwise altered as described herein.

In various embodiments, processes for optimizing a quantum program include receiving an initial quantum program, identifying the initial input qubit set and/or the initial output qubit set (e.g., by parsing and/or analyzing the initial quantum program), determining one or more causal cones associated with one or more output qubits of the initial output qubit set based on associated initial input qubits of the initial input qubit set, optimizing the initial quantum program, generating an optimized quantum program based on optimization of the initial quantum program, compiling the optimized quantum program, and/or executing the compiled optimized quantum program. In various embodiments, and as described herein, the optimizing may use an exact method and/or a heuristic method to optimize an initial quantum program that may be generated.

FIG. 8 illustrates operations of an example process for optimizing a quantum program in accordance with at least some example embodiments of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described, such as on the non-transitory computer-readable storage medium of computing entity 10 or controller 30. Alternatively or additionally, in some embodiments, the process 800 is performed by one or more specially configured computing devices, such as the computing entity 10, controller 30, or a computing entity of quantum computer 110 (not depicted in FIG. 1), and this may be alone or in communication with one or more other component(s), device(s), system(s), and/or the like. In this regard, in some such embodiments, the computing entity 10, controller 30, or computing entity of quantum computer 110 may be specially configured by computer-coded instructions (e.g., computer program instructions) stored thereon, for example in an associated memory and/or another component depicted and/or described herein and/or otherwise accessible for performing the operations as depicted and described. For purposes of simplifying the description, the process 800 is described as performed by and from the perspective of the controller 30. For example, the computing entity 10 may perform at least some of the steps and/or operations of process 800 and then provide a result thereof to the controller 30. For example, the processing element 308 may execute computer program code and/or executable instructions (e.g., stored in memory 322, 324) to perform one or more steps and/or operations of process 800.

The process 800 begins at operation 802. At operation 802, an initial quantum program is received. In various embodiments, the initial quantum program may be received by controller 30 from a computing entity 10, such as a quantum program provided by a user of the computing entity 10, which may have been entered by the user on computing entity 10 or identified by the user of computing entity 10. In various embodiments, the user of computing entity 10 may identify quantum programs stored on one or more database (not depicted in FIG. 1) to be provided to and received by the controller 30. Such databases may include a quantum program database, which may store a plurality of quantum programs. The initial quantum program may represent various gate operations, measurement operations, and reset operations to be performed on one or more of the qubits. It should be appreciated that the initial quantum program may be ordered such that specific gate operations occur in accordance with a particular desired order.

At operation 804, one or more causal cones of the initial quantum program are determined. In various embodiments, the determination is based on the initial input qubits, gate operations, and measurement operations for how each input qubit and gate operation may result in each of the initial output qubits that may be measured. For example, a respective causal cone for each of the initial output qubits is determined. In various embodiments, to determine a causal cone, the quantum circuit may be converted into a directed acyclic graph (DAG), wherein each node in the graph is an input qubit, output qubit, or a quantum operation (e.g., gate, measurement, or reset). Using the DAG, the gates and input qubits in the causal cone of an output qubit may be determined by finding the ancestor nodes of an output qubit node in the DAG. In various embodiments, the determination is based on the order in which operations are applied to the qubits. For example, for each output qubit, the operations may be ordered from the final operation (e.g., measurement) sequentially backwards through the quantum program until reaching the beginning of the program. In various embodiments, converting the quantum circuit into a DAG may be performed by a quantum circuit compiler. In various embodiments, computing the ancestor nodes may be performed with an algorithmic operation, such as using techniques from graph theory.

In various embodiments, a qubit may be measured but then later reused and the measured qubit may be referred to as a measurement qubit. In various embodiments, a measurement qubit may be the output of a portion of, but not all of, a quantum program. Based on the causal cone structure, a determinization of a causal cone may be mapped for each measurement qubit of a quantum program. In various embodiments, the causal cone structure (e.g., a plurality of causal cones that each corresponds to a respective initial output qubit) are determined by analyzing and/or processing the quantum program by processing element 205 and/or 308.

At operation 806, an initial quantum program is optimized for measurement ordering to facilitate maximal qubit reuse. In various embodiments, based on a causal cone structure determined for a causal cone associated with a measurement qubit, the measurement qubit may be determined to be available for reuse. In various embodiments, reuse of a qubit may be done by reinitializing an atomic object to be a qubit of a known ground state where the known ground state may be representative of another qubit in the initial input qubit set. The optimized quantum program may contain one or more commands that correspond to instructions to perform a measurement operation on a measurement qubit, to reinitialize the measurement qubit to a ground state of a qubit in the initial input qubit set, and to reorder a sequence of gating operations (or other operations) in order to reduce the number of qubits in the initial input qubit set. In various examples, the optimization may be performed with an exact method and/or a heuristic method.

The initial quantum program may be optimized based at least in part on, what is referred to herein, as an exact method, where a causal cone or more than one causal cones are used in optimizing some or all of a quantum program. In various embodiments, the exact method may be performed based on optimizing the quantum program by minimizing the total number of qubits used and/or needed in an optimized quantum program (e.g., by reusing atomic objects embodying the qubits as appropriate). In an example embodiment, the exact method may be performed based on optimizing the quantum program by minimizing the number of qubits used and/or needed at any one point in time in an optimized quantum program. In various embodiments, the exact method may include the execution of one or more models, such as a constraint programming model and/or binary linear integer programming model. In various embodiments, these models may be used in conjunction with one or more solvers which implement a combination of techniques to solve the models, including but not limited to domain simplification, constraint decomposition, lazy clause generation, large neighborhood search, backtracking, branching, and/or cutting planes.

In various embodiment, the exact method may include a binary integer programming model, wherein model inputs to be optimized take the values 0 or 1 (i.e., binary integers). In an example, the binary integer program model may be a constraint programming model, wherein the optimization may be via constraints on the binary variables. The quantity of model inputs as well as constraints on the model inputs may be varied such that the solution found optimizes an objective (e.g., qubit reuse). In various embodiments, the optimization may determine the order that qubits should be measured in a manner that minimizes the qubits used while following specified constraints, such as each qubit in the initial input qubit set only being measured a specific number of times (e.g., once) and tracking the qubits required for execution of the quantum program. In various embodiments, constraints may include Boolean and/or inequality constraints.

The initial quantum program may be optimized based at least in part on, what is referred to herein, as a heuristic method. In various embodiments, the heuristic method includes a greedy method or modified greedy method, where one or more causal cones are used to determine where an output state may be measured and a qubit may be reset, which may be performed based on a rule set. In some embodiments the rule set may contain rules to optimize using one or more algorithms, such as optimizing over a first qubit chosen with a greedy method. In various embodiments, a greedy method may be an algorithmic strategy that makes an optimal choice with small stages without regard to overall consequences. Additionally or alternatively, the rule set may contain rules to select an order within which qubits are added to a qubit reset queue based at least in part on their respective causal cones. For example, the heuristic method may choose the reset order based on one or more rules that implicitly minimize the total number of qubits in the optimized quantum program.

In various embodiments, the greedy method may optimize a quantum program by measuring a first output qubit with the smallest causal cone. Then the order in which subsequent measurements and resets of other output qubits are applied may be determined by selecting, at each step, an output qubit to be measured and reset that adds the fewest new qubits not present in the causal cones of previously reset output qubits.

In various embodiments, the heuristic model may include a modified greedy method where the first output qubit is not necessarily the one with the smallest causal cone but rather, if there are N qubits, N different output qubit orderings are determined, in each of which a different output qubit is chosen to be measured and reset first. Out of the N different orderings, the ordering requiring the fewest number of qubits to execute on the quantum computer is determined.

Both the exact method and heuristic method may optimize a quantum program or a portion of a quantum program, which may include determining the order and/or timing in which one or more qubits are measured, reset, and reused. In various embodiments, the exact method may produce an optimal answer but require a potentially large computational overhead, which may, in various embodiments, require a prohibitive amount of resources and/or time. In various embodiments, the heuristic method may produce a potentially suboptimal answer with much smaller computational overhead. In various embodiments all or a portion of a quantum program may be optimized using one or both of the exact method and the heuristic method.

Optimization using the exact method and/or the heuristic method may optimize either an entire quantum program or a portion of a quantum program. In various embodiments only the exact method or the heuristic method may be used. In various embodiments, both the exact method and the heuristic method may both be used, and the methods may be run in parallel, in series, or iteratively, which may depend on if an entire initial quantum program is being optimized by a particular method or if portions of an initial quantum program are being optimized by a particular method.

In operation 806, the optimization is to facilitate maximal qubit reuse, but in various embodiments the optimization may be for less than maximal qubit reuse. The execution of a quantum program involves many factors to be considered, including but not limited to memory usage, noise generation, and heating. An optimization may be for less than maximal qubit reuse in order for the optimization to satisfy requirements or targets associated with factors other than qubit reuse.

At operation 808, the optimized quantum program is generated. In various embodiments, the initial quantum program may be rewritten as the optimized quantum program, such as with rewriting the quantum program using mid-program measurements and resets to reduce the atomic objects required for the optimized input qubit set. In other embodiments, an optimized quantum program may be generated based on the initial quantum program without rewriting the initial quantum program, such as by writing a new quantum program comprising the optimized quantum program. The optimized quantum program may be saved to a database, such as a quantum program database.

At operation 810, the optimized quantum program is compiled. In various embodiments, the controller 30 may compile the optimized quantum program into a set of qubit manipulation instructions to be executed by the quantum computer 110. For example, such commands may cause qubits to be physically repositioned within the quantum computing environment, cause gate operations to be invoked based on qubits, cause measurements of qubits to occur, and/or cause reinitializing of a qubit to a known ground state.

At operation 812, the optimized quantum program is executed. In various embodiments, execution of the set of qubit manipulation instructions of the compiled optimized quantum program causes execution of the optimized quantum program with a reduced number of input qubits, which may be fewer than the initial input qubit set, to occur. Various embodiments may include execution by controller 30 using the quantum computer 110, including the execution of gate operations, measurements of qubits, and resetting of qubits, which may then be reused in the execution of the optimized quantum program.

In an example embodiment wherein an initial quantum program 400 associated with FIG. 4 may be optimized to an optimized quantum program 600 of FIG. 6, the operations of quantum program 400 are modified to include the additional operations illustrated in the visualization of FIG. 6. In this example, the optimization includes instructions for measuring the output state of qubit q1 and resetting qubit q1 to be qubit q4. A user of the computing entity 10 may enter an initial quantum program into computing entity 10 and transmit it to the quantum computer 110. The controller 30 of the quantum computer 10 receives the initial quantum program. The controller 30 identifies an initial qubit set of q0, q1, q2, q3, and q4 associated with the initial quantum program, such as quantum program 400 of FIG. 4. A determination may be of one or more causal cones, such as for an initial output qubit (e.g., q1) being associated with an initial input qubit set (e.g., q0, q1, q2, and q3). Based on the initial quantum program and the associated initial input qubit set for each qubit of the initial output qubit set, a causal cone for each output qubit is determined. In the example embodiment, based on the causal cone, the initial quantum program 400 may be optimized to produce the optimized quantum program 600, which may be based on, among other things, the available number of atomic objects available to serve as qubits to execute the initial quantum program. This optimized quantum program 600, as described above, may include a measurement and resetting of a qubit. The optimized quantum program 600 may then be compiled into executable instructions that may be executed on quantum computer 110.

In the preceding example, the optimized input qubit set of the optimized quantum program included a subset of the initial input qubit set (e.g., the optimized input qubit set of quantum program 600 does not include qubit q4 as an input qubit in the optimized input qubit set because qubit q1 is reset as qubit q4 at operation 620).

In various embodiments, an initial quantum program may not be able to be expressed as an optimized quantum program with fewer qubits. In such embodiments, the optimization, such as with the exact method and/or heuristic method, may determine an optimized quantum program with the same number of initial input qubits as the initial quantum program. In various embodiments, an optimized quantum program may not include any reset operations.

FIG. 9 illustrates operations of an example process to optimize an initial quantum program in accordance with at least some example embodiments of the present disclosure using a greedy method, such as illustrated at step 806 of FIG. 8. While FIG. 9 depicts specific operations for an embodiment of the greedy method that may be performed during process 800, it is appreciated that additional operations or iterations of the operations illustrated in FIG. 9 may be performed.

At operation 902 of FIG. 9, the computing entity 10 and/or controller 30 initialize a reset order list. In various embodiments, a reset ordering list may store a measurement ordering, which may be an ordering of measurement operations and reset operations.

At operation 904, the computing entity 10 and/or controller 30 determine an output qubit (e.g., an initial output qubit) not in the reset order list, wherein the output qubit is associated with a causal cone containing the fewest new input qubits (e.g., input qubits not in the causal cones of other output qubits already in the reset order list).

At operation 906, the computing entity 10 and/or controller 30 adds the determined output qubit to the reset order list. In various embodiments, after an output qubit is added to the reset order list, operation 904 may be performed again to determine another output qubit not in the reset order list. Such iterations may continue until all of the output qubits (e.g., all of the output qubits in the initial output qubit set) have been added to the reset order list.

At operation 908, the reset order list is returned. In various embodiments, the reset order list includes an optimized ordering of operations to facilitate maximal qubit reuse. In various embodiments, the reset order list may be used to generate an optimized quantum program.

In an example embodiment, the computing entity 10 and/or controller 30 uses the exact method or heuristic method to determine one or more qubits to reset and then uses other method (e.g., heuristic method or exact method) to determine the remaining order of qubits to reset. For example, in an example embodiment, the heuristic method may be used to reduce the solution space to be explored by the exact method for completing optimization of the quantum program.

At operation 908, the determined reset order list is returned and an optimized quantum program is generated based on the determined reset order list. The determined reset order list and/or the optimized quantum program may then be passed to a compiler to compile the optimized quantum program for execution by a quantum computer 110.

In various embodiments, the optimized quantum program is determined based on the dual of the quantum circuit. For example, FIG. 10A illustrates an example quantum circuit 1020 comprising three state preparation operations 1002 (e.g., 1002A, 1002B, 1002C), three measurement operations 1006 (e.g., 1006A, 1006B, 1006C), and three two qubit gates 1004 (e.g., 1004A, 1004B, 1004C). FIG. 10B illustrates the dual 1022 of the quantum circuit 1020. In general, the dual of a quantum circuit is generated by replacing the measurement operations of the quantum circuit with state preparation operations, replacing the state preparation operations of the quantum circuit with measurement operations, and reversing the flow of time for the quantum circuit. For example, the dual 1022 of the quantum circuit 1020 comprises three state preparation operations 1002, three measurement operations 1006, and three two qubit gates 1004. However, the three two qubit gates 1004 of the dual 1022 of the quantum circuit 1020 are in the opposite order compared to the quantum circuit 1020. Notably, the dual 1022 of the quantum circuit 1020 requires the same number of qubits as the quantum circuit 1020.

Thus, for a quantum circuit C, the dual of the quantum circuit C* can be determined. The dual of the quantum circuit C* may be optimized to reduce the number of qubits required and/or used by the dual of the quantum circuit C* using the same process as described above (e.g., as illustrated in FIGS. 8 and/or 9) to determine and/or generate the optimized dual of the quantum circuit R(C*). In general, the dual of the optimized dual of the quantum circuit R(C*)* is functionally equivalent to the optimized quantum circuit R(C), which is generated and/or determined so as to be functionally equivalent to the quantum circuit C.

For a quantum circuit C, the dual of the quantum circuit C* uses the same number of qubits. For example, for a quantum circuit C that uses an initial number of qubits N, the dual of the quantum circuit C* will also use the initial number of qubits N. The optimized and/or qubit reduced version of the quantum circuit R(C) requires and/or uses a first reduced number of qubits $M_1<N$. The dual of the quantum circuit C* can also be optimized to use a reduced number of qubits using the same process as described above (e.g., as illustrated in FIGS. 8 and/or 9). The optimized and/or qubit reduced version of the dual of the quantum circuit R(C*) requires and/or uses a second reduced number of qubits $M_2<N$. In various scenarios, $M_1<M_2$, $M_1=M_2$, or $M_1>M_2$. Thus, in some scenarios it is advantageous to perform a quantum circuit by performing the dual of the optimized dual of the quantum circuit R(C*)*.

FIG. 11 provides a flowchart illustrating various processes, procedures, operations, and/or the like for determining and performing an optimized quantum program. Specifically, FIG. 11 depicts operations of an example process 1100. In some embodiments, the process 1100 is embodied by computer program code stored on a non-transitory computer-readable storage medium of a computer program product configured for execution to perform the process as depicted and described, such as on the non-transitory computer-readable storage medium of computing entity 10 or controller 30. Alternatively or additionally, in some embodiments, the process 1100 is performed by one or more specially configured computing devices, such as the computing entity 10, controller 30, or a computing entity of quantum computer 110 (not depicted in FIG. 1), and this may be alone or in communication with one or more other component(s), device(s), system(s), and/or the like. In this regard, in some such embodiments, the computing entity 10, controller 30, or computing entity of quantum computer 110 may be specially configured by computer-coded instructions (e.g., computer program instructions) stored thereon, for example in an associated memory and/or another component depicted and/or described herein and/or otherwise accessible for performing the operations as depicted and described. For purposes of simplifying the description, the process 1100 is described as performed by and from the perspective of the controller 30. For example, the computing entity 10 may perform at least some of the steps and/or operations of process 1100 and then provide a result thereof to the controller 30. For example, the processing element 308 may execute computer program code and/or executable instructions (e.g., stored in memory 322, 324) to perform one or more steps and/or operations of process 1100.

The process 1100 begins at operation 1102. At operation 1102, an initial quantum program is received. In various embodiments, the initial quantum program may be received by controller 30 from a computing entity 10, such as a quantum program provided by a user of the computing entity 10, which may have been entered by the user on computing entity 10 or identified by the user of computing entity 10. In various embodiments, the user of computing entity 10 may identify quantum programs stored on one or more database (not depicted in FIG. 1) to be provided to and received by the controller 30. Such databases may include a quantum program database, which may store a plurality of quantum programs. The initial quantum program may represent various gate operations, measurement operations, and reset operations to be performed on one or more of the qubits. It should be appreciated that the initial quantum program may be ordered such that specific gate operations occur in accordance with a particular desired order.

At operation 1104, the dual of the initial quantum program is determined and/or generated. For example, the dual of the initial quantum program is determined and/or generated by replacing the measurement operations of the initial quantum program with state preparation operations, replacing the state preparation operations of the initial quantum program with measurement operations, and reversing the time order of the initial quantum program.

At operation 1106A, one or more causal cones of the initial quantum program are determined. In various embodiments, the determination is based on the initial input qubits, gate operations, and measurement operations for how each input qubit and gate operation may result in each of the initial output qubits that may be measured. For example, a respective causal cone for each of the initial output qubits is determined based on the initial quantum program. In various embodiments, to determine a causal cone, the quantum circuit may be converted into a directed acyclic graph (DAG), wherein each node in the graph is an input qubit, output qubit, or a quantum operation (e.g., gate, measurement, or reset). Using the DAG, the gates and input qubits in the causal cone of an output qubit may be determined by finding the ancestor nodes of an output qubit node in the DAG. In various embodiments, the determination is based on the order in which operations are applied to the qubits based on the initial quantum circuit. For example, for each output qubit, the operations may be ordered from the final operation (e.g., measurement) sequentially backwards through the quantum program until reaching the beginning of the program. In various embodiments, converting the quantum circuit into a DAG may be performed by a quantum circuit compiler. In various embodiments, computing the ancestor nodes may be performed with an algorithmic operation, such as using techniques from graph theory.

In various embodiments, a qubit may be measured but then later reused and the measured qubit may be referred to as a measurement qubit. In various embodiments, a measurement qubit may be the output of a portion of, but not all of, a quantum program. Based on the causal cone structure, a determinization of a causal cone may be mapped for each measurement qubit of a quantum program. In various embodiments, the causal cone structure (e.g., a plurality of causal cones that each corresponds to a respective initial output qubit) are determined by analyzing and/or processing the quantum program by processing element 205 and/or 308.

At operation 1106B, one or more causal cones of the dual of the initial quantum program are determined. In various embodiments, the determination is based on the dual representation of the initial input qubits, gate operations, and measurement operations for how each input qubit and gate operation may result in each of the initial output qubits that may be measured. For example, a respective causal cone for each of the initial output qubits is determined based on the dual of the initial quantum program. In various embodiments, to determine a causal cone, the quantum circuit may be converted into a directed acyclic graph (DAG), wherein each node in the graph is an input qubit, output qubit, or a quantum operation (e.g., gate, measurement, or reset). Using the DAG, the gates and input qubits in the causal cone of an output qubit may be determined by finding the ancestor nodes of an output qubit node in the DAG. In various embodiments, the determination is based on the order in which operations are applied to the qubits in the dual of the initial quantum program. For example, for each output qubit, the operations may be ordered from the final operation (e.g., measurement) sequentially backwards through the dual of the initial quantum program until reaching the beginning of the dual of the quantum program. In various embodiments, converting the dual of the initial quantum circuit into a DAG may be performed by a quantum circuit compiler. In various embodiments, computing the ancestor nodes may be performed with an algorithmic operation, such as using techniques from graph theory.

In various embodiments, a qubit may be measured but then later reused and the measured qubit may be referred to as a measurement qubit. In various embodiments, a measurement qubit may be the output of a portion of, but not all of, a quantum program. Based on the causal cone structure, a determinization of a causal cone may be mapped for each measurement qubit of a dual of a quantum program. In various embodiments, the causal cone structure (e.g., a plurality of causal cones that each corresponds to a respective initial output qubit) are determined by analyzing and/or processing the dual of the quantum program by processing element 205 and/or 308.

At operation 1108A, an initial quantum program is optimized for measurement ordering to facilitate maximal qubit reuse. In various embodiments, based on a causal cone structure determined for a causal cone associated with a measurement qubit of the initial quantum program, the measurement qubit may be determined to be available for reuse. In various embodiments, reuse of a qubit may be done by reinitializing an atomic object to be a qubit of a known ground state where the known ground state may be representative of another qubit in the initial input qubit set. The optimized quantum program may contain one or more commands that correspond to instructions to perform a measurement operation on a measurement qubit, to reinitialize the measurement qubit (e.g., perform a state preparation operation on the measurement qubit after the measurement has been performed) to a ground state of a qubit in the initial input qubit set, and to reorder a sequence of gating operations (or other operations) in order to reduce the number of qubits in the initial input qubit set. In various examples, the optimization may be performed with an exact method and/or a heuristic method.

The initial quantum program may be optimized based at least in part on, what is referred to herein, as an exact method, where a causal cone or more than one causal cones are used in optimizing some or all of a quantum program. In various embodiments, the exact method may be performed based on optimizing the quantum program by minimizing the total number of qubits used and/or needed in an optimized quantum program (e.g., by reusing atomic objects embodying the qubits as appropriate). In an example embodiment, the exact method may be performed based on optimizing the quantum program by minimizing the number of qubits used and/or needed at any one point in time in an optimized quantum program. In various embodiments, the exact method may include the execution of one or more models, such as a constraint programming model and/or binary linear integer programming model. In various embodiments, these models may be used in conjunction with one or more solvers which implement a combination of techniques to solve the models, including but not limited to domain simplification, constraint decomposition, lazy clause generation, large neighborhood search, backtracking, branching, and/or cutting planes.

In various embodiment, the exact method may include a binary integer programming model, wherein model inputs to be optimized take the values 0 or 1 (i.e., binary integers). In an example, the binary integer program model may be a constraint programming model, wherein the optimization may be via constraints on the binary variables. The quantity of model inputs as well as constraints on the model inputs may be varied such that the solution found optimizes an objective (e.g., qubit reuse). In various embodiments, the optimization may determine the order that qubits should be measured in a manner that minimizes the qubits used while following specified constraints, such as each qubit in the initial input qubit set only being measured a specific number of times (e.g., once) and tracking the qubits required for execution of the quantum program. In various embodiments, constraints may include Boolean and/or inequality constraints.

The initial quantum program may be optimized based at least in part on, what is referred to herein, as a heuristic method. In various embodiments, the heuristic method includes a greedy method or modified greedy method, where one or more causal cones are used to determine where an output state may be measured and a qubit may be reset, which may be performed based on a rule set. In some embodiments the rule set may contain rules to optimize using one or more algorithms, such as optimizing over a first qubit chosen with a greedy method. In various embodiments, a greedy method may be an algorithmic strategy that makes an optimal choice with small stages without regard to overall consequences. Additionally or alternatively, the rule set may contain rules to select an order within which qubits are added to a qubit reset queue based at least in part on their respective causal cones. For example, the heuristic method may choose the reset order based on one or more rules that implicitly minimize the total number of qubits in the optimized quantum program.

In various embodiments, the greedy method may optimize a quantum program by measuring a first output qubit with the smallest causal cone. Then the order in which subsequent measurements and resets of other output qubits are applied may be determined by selecting, at each step, an output qubit to be measured and reset that adds the fewest new qubits not present in the causal cones of previously reset output qubits.

In various embodiments, the heuristic model may include a modified greedy method where the first output qubit is not necessarily the one with the smallest causal cone but rather, if there are N qubits, N different output qubit orderings are determined, in each of which a different output qubit is chosen to be measured and reset first. Out of the N different orderings, the ordering requiring the fewest number of qubits to execute on the quantum computer is determined.

Both the exact method and heuristic method may optimize a quantum program or a portion of a quantum program, which may include determining the order and/or timing in which one or more qubits are measured, reset, and reused. In various embodiments, the exact method may produce an optimal answer but require a potentially large computational overhead, which may, in various embodiments, require a prohibitive amount of resources and/or time. In various embodiments, the heuristic method may produce a potentially suboptimal answer with much smaller computational overhead. In various embodiments all or a portion of a quantum program may be optimized using one or both of the exact method and the heuristic method.

Optimization using the exact method and/or the heuristic method may optimize either an entire quantum program or a portion of a quantum program. In various embodiments only the exact method or the heuristic method may be used. In various embodiments, both the exact method and the heuristic method may both be used, and the methods may be run in parallel, in series, or iteratively, which may depend on if an entire initial quantum program is being optimized by a particular method or if portions of an initial quantum program are being optimized by a particular method.

In operation 1108A, the optimization is to facilitate maximal qubit reuse, but in various embodiments the optimization may be for less than maximal qubit reuse. The execution of a quantum program involves many factors to be considered, including but not limited to memory usage, noise generation, and heating. An optimization may be for less than maximal qubit reuse in order for the optimization to satisfy requirements or targets associated with factors other than qubit reuse.

At operation 1108B, the dual of the initial quantum program is optimized for measurement ordering to facilitate maximal qubit reuse. In various embodiments, based on a causal cone structure determined for a causal cone associated with a measurement qubit of the dual of the initial quantum program, the measurement qubit may be determined to be available for reuse. The optimized dual quantum program may contain one or more commands that correspond to instructions to perform a measurement operation on a measurement qubit, to reinitialize the measurement qubit (e.g., perform a state preparation operation on the measurement qubit after the measurement has been performed) to a ground state of a qubit in the initial input qubit set, and to reorder a sequence of gating operations (or other operations) in order to reduce the number of qubits in the initial input qubit set. In various examples, the optimization may be performed with an exact method and/or a heuristic method. For example, the optimized dual quantum program may be generated from the dual of the quantum program using a same or similar technique as used to generate the optimized quantum program from the initial quantum program.

In operation 1108B, the optimization is to facilitate maximal qubit reuse, but in various embodiments the optimization may be for less than maximal qubit reuse. The execution of a quantum program involves many factors to be considered, including but not limited to memory usage, noise generation, and heating. An optimization may be for less than maximal qubit reuse in order for the optimization to satisfy requirements or targets associated with factors other than qubit reuse.

At operation 1110A, the optimized quantum program is generated. In various embodiments, the initial quantum program may be rewritten as the optimized quantum program, such as with rewriting the quantum program using mid-program measurements and resets to reduce the atomic objects required for the optimized input qubit set. In other embodiments, an optimized quantum program may be generated based on the initial quantum program without rewriting the initial quantum program, such as by writing a new quantum program comprising the optimized quantum program. The optimized quantum program may be saved to a database, such as a quantum program database. In various embodiments, the optimized quantum program requires and/or uses a first reduced number of qubits $M_1 < N$, where N is the number of qubits required and/or used by the initial quantum program and the dual of the initial quantum program.

At operation 1110B, the dual of the optimized dual quantum program is generated. In various embodiments, the initial quantum program may be rewritten as the dual of the optimized dual quantum program, such as with rewriting the quantum program using mid-program measurements and resets to reduce the atomic objects required for the optimized input qubit set. In other embodiments, a dual of the optimized dual quantum program may be generated based on the initial quantum program without rewriting the initial quantum program, such as by writing a new quantum program comprising the dual of the optimized dual quantum program. The dual of the optimized dual quantum program may be saved to a database, such as a quantum program database. In various embodiments, the dual of the optimized dual quantum program requires and/or uses a second reduced number of qubits $M_2 < N$, where N is the number of qubits required and/or used by the initial quantum program and the dual of the initial quantum program.

In various embodiments, operations 1106A, 1108A, and 1110A are performed in parallel or in series with operations 1106B, 1108B, and 1110B.

At operation 1112, one of the optimized quantum program or the dual of the optimized dual quantum program is selected. For example, the first reduced number of qubits $M_1$ and the second reduced number of qubits $M_2$ are compared to determine which is smaller. In an example embodiment, when the first reduced number of qubits $M_1$ is smaller than the second reduced number of qubits $M_2$, the optimized quantum program is selected. In an example embodiment, when the second reduced number of qubits $M_2$ is smaller than the first reduced number of qubits $M_1$, the dual of the optimized dual quantum program is selected.

In an example embodiment, only the selected one of the optimized quantum program or the dual of the optimized dual quantum program is stored to the quantum program database. In an example embodiment, only one set of operations 1106A, 1108A, and 1110A or operations 1106B, 1108B, and 1110B is performed and operation 1112 is skipped.

At operation 1114, the selected quantum program is compiled. In various embodiments, the controller 30 may compile the selected quantum program into a set of qubit manipulation instructions to be executed by the quantum computer 110. For example, such commands may cause qubits to be physically repositioned within the quantum computing environment, cause gate operations to be invoked based on qubits, cause measurements of qubits to occur, and/or cause reinitializing of a qubit to a known ground state. For example, the selected one of the optimized quantum program or the dual of the optimized dual quantum program is compiled to generate and/or provide a compiled quantum program.

At operation 1116, the compiled quantum program is executed. In various embodiments, execution of the set of qubit manipulation instructions of the compiled quantum program causes execution of the selected one of the optimized quantum program or the dual of the optimized dual quantum program with a reduced number of input qubits (e.g., the first reduced number of qubits $M_1$ when the compiled quantum program is the compiled optimized quantum program or the second reduced number of qubits $M_2$ when the compiled program is the compiled dual of the optimized dual quantum program), which may be fewer than the initial input qubit set, to occur. Various embodiments may include execution by controller 30 using the quantum computer 110, including the execution of gate operations, measurements of qubits, and resetting of qubits, which may then be reused in the execution of the compiled quantum program.

Conclusion

Although an example system has been described above, implementations or embodiments of the subject matter and the operations described herein can be implemented in other types of digital electronic circuitry, computer software or program, firmware, or hardware, including the structures disclosed in this specification and their structural equivalents, or in combinations of one or more of them.

Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" as used above encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing, and grid computing infrastructures.

Computer software or computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A computer program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory having computer-coded instructions stored thereon that, in execution with the at least one processor, configure the apparatus to:
   receive an initial quantum program;
   identify, from the initial quantum program, an initial output qubit set;
   determine, based on the initial quantum program and the initial output qubit set, one or more causal cones associated with the initial quantum program; and
   generate an optimized quantum program based on the initial quantum program, the initial output qubit set, and the one or more causal cones.

2. The apparatus according to claim 1, wherein the optimized quantum program is associated with an optimized input qubit set that includes one or more fewer qubits than an initial input qubit set.

3. The apparatus according to claim 1, wherein the optimized quantum program includes at least one of a measurement operation or a reset operation.

4. The apparatus according to claim 1, wherein the optimized quantum program includes a plurality of same gating operations as the initial quantum program.

5. The apparatus according to claim 1, wherein the apparatus is further configured to:
   execute the optimized quantum program on a quantum computer.

6. The apparatus according to claim 1, wherein the apparatus is further configured to:
   determine a dual of the initial quantum program;
   determine, based on the dual of the initial quantum program, one or more causal cones associated with the dual of the initial quantum program; and
   generate an optimized dual quantum program based on the dual of the initial quantum program, and the one or more causal cones associated with the dual of the initial quantum program.

7. The apparatus according to claim 6, wherein the apparatus is further configured to:
   determine a first reduced number of qubits corresponding to the optimized quantum program;
   determine a second reduced number of qubits corresponding to the optimized dual quantum program;
   when the first reduced number of qubits is smaller than or equal to the second reduced number of qubits, compile and cause execution of the optimized quantum program; and
   when the second reduced number of qubits smaller than the first reduced number of qubits, compile and cause execution of a dual of the optimized dual quantum program.

8. A computer-implemented method comprising:
   receiving, at a controller of a quantum computer, an initial quantum program;
   identifying, by the controller, and from the initial quantum program, an initial qubit set;
   determining, by the controller, based on the initial quantum program and the initial qubit set, one or more causal cones associated with the initial quantum program; and
   generating, by the controller, an optimized quantum program based on the initial quantum program, the initial qubit set, and the one or more causal cones.

9. The computer-implemented method according to claim 8, wherein the optimized quantum program is associated with an optimized input qubit set that includes one or more fewer qubits than an initial input qubit set.

10. The computer-implemented method according to claim 8, wherein the optimized quantum program includes at least one of a measurement operation or a reset operation.

11. The computer-implemented method according to claim 8, wherein the optimized quantum program includes a plurality of same gating operations as the initial quantum program.

12. The computer-implemented method according to claim 8, the computer-implemented method further comprising:
   executing the optimized quantum program on the quantum computer.

13. The computer-implemented method according to claim 8, further comprising:
   determining a dual of the initial quantum program;
   determining based on the dual of the initial quantum program, one or more causal cones associated with the dual of the initial quantum program; and
   generating an optimized dual quantum program based on the dual of the initial quantum program, and the one or more causal cones associated with the dual of the initial quantum program.

14. The computer-implemented method according to claim 13, further comprising:
   determining a first reduced number of qubits corresponding to the optimized quantum program;

determining a second reduced number of qubits corresponding to the optimized dual quantum program;

when the first reduced number of qubits is smaller than or equal to the second reduced number of qubits, compiling and causing execution of the optimized quantum program; and when the second reduced number of qubits smaller than the first reduced number of qubits, compiling and causing execution of a dual of the optimized dual quantum program.

15. A computer program product comprising at least one non-transitory computer-readable storage medium having computer program code stored thereon that, in execution with at least one processor, is configured for:

receiving an initial quantum program;

identifying, from the initial quantum program, an initial qubit set;

determining based on the initial quantum program and the initial qubit set, one or more causal cones associated with the initial quantum program; and generating an optimized quantum program based on the initial quantum program, the initial qubit set, and the one or more causal cones.

16. The computer program product according to claim 15, wherein the optimized quantum program is associated with an optimized input qubit set that includes one or more fewer qubits than an initial input qubit set.

17. The computer program product according to claim 15, wherein the optimized quantum program includes at least one of a measurement operation or a reset operation.

18. The computer program product according to claim 15, wherein the optimized quantum program includes a plurality of same gating operations as the initial quantum program.

19. The computer program product according to claim 15, wherein the computer program code, when executed by the at least one processor, is further configured for:

determining a dual of the initial quantum program;

determining based on the dual of the initial quantum program, one or more causal cones associated with the dual of the initial quantum program; and generating an optimized dual quantum program based on the dual of the initial quantum program, and the one or more causal cones associated with the dual of the initial quantum program.

20. The computer program product according to claim 19, wherein the computer program code, when executed by the at least one processor, is further configured for:

determining a first reduced number of qubits corresponding to the optimized quantum program;

determining a second reduced number of qubits corresponding to the optimized dual quantum program;

when the first reduced number of qubits is smaller than or equal to the second reduced number of qubits, compiling and causing execution of the optimized quantum program; and when the second reduced number of qubits smaller than the first reduced number of qubits, compiling and causing execution of a dual of the optimized dual quantum program.

* * * * *